United States Patent [19]
Mogi

[11] Patent Number: 5,270,828
[45] Date of Patent: Dec. 14, 1993

[54] RECORDING AND REPRODUCING METHOD AND APPARATUS UTILIZING A SIGNAL FORMAT FOR SIMPLIFYING SPECIAL OPERATIONS AND ASSISTING EFFICIENT SIGNAL PROCESSING

[75] Inventor: Takao Mogi, Utsunomiya, Japan

[73] Assignee: Aiwa Co., Ltd., Tokyo, Japan

[21] Appl. No.: 710,136

[22] Filed: Jun. 4, 1991

[30] Foreign Application Priority Data

Jun. 15, 1990 [JP] Japan ................................. 2-156726

[51] Int. Cl.$^5$ .......................... H04N 5/76; H04N 7/12
[52] U.S. Cl. .................................. 358/335; 358/343; 358/133; 360/32; 360/19.1
[58] Field of Search ................ 358/335, 310, 342, 343, 358/312, 338, 339, 312, 321, 322, 341, 123, 135, 136, 138, 105; 368/10.1, 19.1, 32

[56] References Cited

U.S. PATENT DOCUMENTS

| | | | |
|---|---|---|---|
| 4,290,081 | 9/1981 | Foerster | 358/312 |
| 4,531,161 | 7/1985 | Murakoshi | 358/341 |
| 4,649,436 | 3/1987 | Tanalca | 358/312 |
| 4,692,816 | 9/1987 | Sugiyama et al. | 358/312 |
| 4,710,826 | 12/1987 | Sakurai | 360/9.1 |
| 4,725,895 | 2/1988 | Miyamoto et al. | 358/312 |
| 4,814,897 | 3/1989 | Kojima et al. | 358/338 |
| 4,835,623 | 5/1989 | Okano et al. | 358/338 |
| 4,847,701 | 7/1989 | Suesada | 358/312 |
| 4,931,878 | 6/1990 | Takei et al. | 358/341 |
| 4,931,879 | 6/1990 | Koga et al. | 358/335 |
| 4,942,476 | 7/1990 | Koga et al. | 358/335 |
| 5,032,927 | 7/1991 | Watanabe et al. | 358/343 |
| 5,060,077 | 10/1991 | Koya et al. | 358/312 |
| 5,062,010 | 10/1991 | Saito | 358/341 |
| 5,067,029 | 11/1991 | Takahashi | 358/906 |
| 5,140,437 | 8/1992 | Yonemitsu et al. | 358/342 |

FOREIGN PATENT DOCUMENTS

| | | |
|---|---|---|
| 0406595 | 1/1991 | European Pat. Off. . |
| 62-154374 | 7/1987 | Japan . |
| 2-123565 | 5/1990 | Japan . |

OTHER PUBLICATIONS

Patent Abstracts of Japan, vol. 14, No. 345 (P-1083) Jul. 26, 1990 JP (A) 02-123565.
Patent Abstracts of Japan, vol. 11, No. 389 (P-648) Dec. 19, 1987 JP (A) 62-154374.
Patent Abstracts of Japan, vol. 16, No. 236 (E-1210) May 29, 1992 JP (A) 04-047873.
Patent Abstracts of Japan, vol. 16, No. 236 (E-1210) May 29, 1992 JP (A) 04-047888.

*Primary Examiner*—Tommy P. Chin
*Assistant Examiner*—Thai Tran
*Attorney, Agent, or Firm*—Dellett and Walters

[57] ABSTRACT

A method of simultaneously recording and reproducing a digital audio signal and a digital video signal for a dynamic picture. A digital signal is recorded and reproduced in N bits (N: integer), and an image area, an audio area and a control area are formed by part of the N bits. Compressed digital video signals for multiple screens forming a dynamic picture are allocated in the image area in each compression reference period. A digital audio signal in each compression reference period is allocated in the audio area in the compression reference period. Data, such as compression information, which concerns a digital signal to be allocated in the image area or audio area, is allocated in the control area. As a digital video signal carrying a vast amount of information is recorded in a compressed manner, and the compression information is recorded at the same time, recording and reproducing the digital video signal for a dynamic picture can be executed without problems.

3 Claims, 24 Drawing Sheets

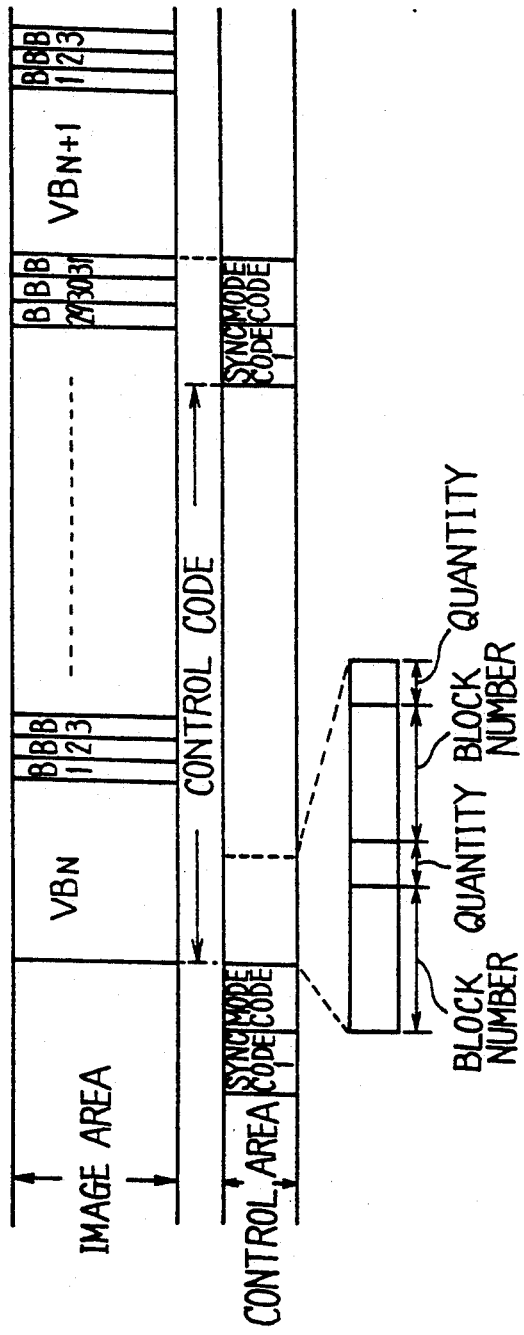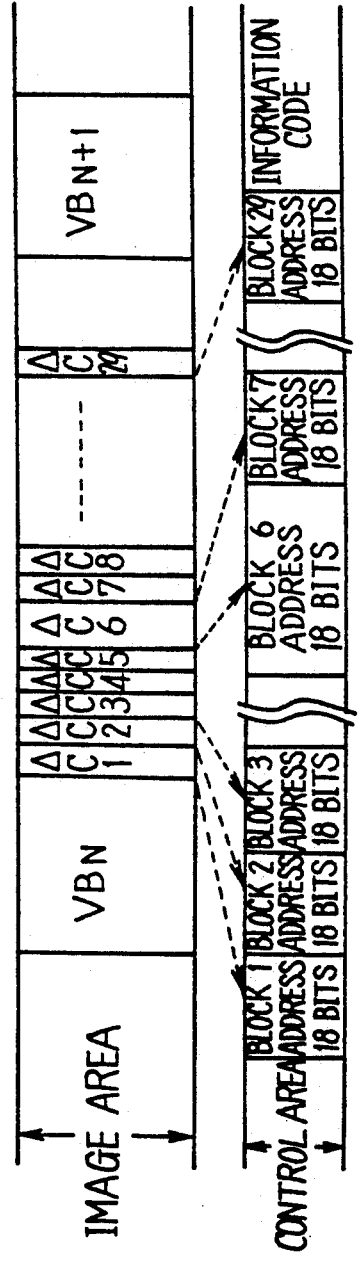

RECORDING AND REPRODUCING METHOD AND APPARATUS UTILIZING A SIGNAL FORMAT FOR SIMPLIFYING SPECIAL OPERATIONS AND ASSISTING EFFICIENT SIGNAL PROCESSING

BACKGROUND OF THE INVENTION

1. Field of the Invention

The present invention relates to technology of concurrently recording and reproducing digital video signals for a dynamic picture and digital audio signals.

2. Description of the Related Art

A conventional digital audio tape recorder (hereafter referred to as "DAT") is designed to record and reproduce only digital audio signals. It will be very useful if the DAT can simultaneously record or reproduce a digital audio signal and another signal, such as a digital video signal for a dynamic picture.

In recording digital video signals for a dynamic picture, however, the digital video signals carry a vast amount of information. Therefore, one has to consider where and how the information should be recorded.

It is therefore an object of the present invention to provide a recording and reproducing method and apparatus that can ensure simultaneous recording/reproducing of a digital audio signal and a digital video signal for producing a dynamic picture of successive screens in sequence.

SUMMARY OF THE INVENTION

According to one aspect of a recording and reproducing method of the present invention, an N-parallel bit composite digital signal (N: integer) is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. The composite digital signal is recorded and reproduced in N bits.

According to another aspect of a recording and reproducing method of the present invention, an N-parallel bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. Data concerning the digital signal to be allocated in the image area or audio area is allocated in the composite control area. The digital signal is recorded and reproduced in N bits.

According to a further aspect of a recording and reproducing method of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. In the control area in each compression reference period is allocated data concerning the digital signal to be allocated in the image areas or audio areas in the following compression reference periods. The composite digital signal is recorded and reproduced in N bits.

According to an additional aspect of a recording and reproducing method of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. In the image area in each compression reference period, image data for one screen is allocated first, the difference image data for multiple screens are allocated. The composite digital signal is recorded and reproduced in N bits. When a scene change is detected by scene change detecting means, recorded signal processing is reset to start a new compression reference period.

According to a different aspect of a recording and reproducing method of the present invention, an N-parallel bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. The composite digital signal is recorded and reproduced in N bits. Recording and reproducing of the digital video signal and digital audio signal are simultaneously processed so that the two are synchronized with each other within each compression reference period.

According to one aspect of a recording and reproducing apparatus of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. The composite digital signal recorded in N bits. An expansion means expands the compressed digital video signal separated from the image area of the reproduced signal. Output means repeatedly outputs expanded image data for one screen.

According to another aspect of a recording and reproducing apparatus of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. In the image area in each compression reference period, image data for one screen is allocated first, then difference image data for multiple screens are allocated. The composite digital signal recorded in N bits is reproduced. Expansion means expands reference image data in the image area in each compression reference period of the reproduced signal. Output means repeatedly outputs expanded image data for one screen.

According to a further aspect of a recording and reproducing apparatus of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. In the image area in each compression reference period, image data for one screen is allocated first, then difference image data for multiple screens are allocated. Data indicating presence of a scene change is allocated in a compression reference period of the control area immediately before the scene change. The composite digital signal recorded in N bits is reproduced. Expansion means expands reference image data in the image area in a compression reference period after the scene change based on the data indicating presence of the scene change allocated in the control area. Output means repeatedly outputs expanded image data for one screen.

According to an additional aspect of a recording and reproducing apparatus of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. The composite digital signal recorded in N bits is reproduced. Expansion means expands compressed digital video signals for multiple screens separated from the image area in each compression reference period of the reproduced signal. Output means repeatedly outputs expanded image data for one screen every predetermined number of screens until next compressed image data for one screen is acquired.

According to an additional aspect of a recording and reproducing method of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. In the control area in each compression reference period are allocated first data and second data concerning digital video signals to be allocated in the image areas in immediately before and immediately after compression reference periods. The composite digital signal recorded in N bits is reproduced.

According to a still another aspect of a recording and reproducing apparatus of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. In the control area in each compression reference period are allocated first data and second data concerning digital video signals to be allocated in the image areas in immediately before and immediately after compression reference periods. The composite digital signal recorded in N bits is reproduced. Data detecting means detects the first and second data from the control areas of the respective compression reference periods of the reproduced signal. In normal reproduction mode and reverse reproduction mode, compressed digital video signals for multiple screens separated from the image areas in the individual compression reference periods of the reproduced signal are reproduced on the basis of the first and second data, respectively.

According to a still additional aspect of a recording and reproducing method of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. In the control area in each compression reference period, a time code is allocated. The composite digital signal recorded in N bits is reproduced.

According to a still additional aspect of a recording and reproducing apparatus of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. The composite digital signal recorded in N bits is reproduced. Reproduction at a normal speed and reproduction at a predetermined fast speed are alternately executed. Expansion means expands a compressed digital video signal separated from the image area of a signal reproduced at the normal speed. Output means repeatedly outputs expanded image data for one screen.

According to a still another aspect of a recording and reproducing apparatus of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. In the image area in each compression reference period, image data for one screen is allocated first, then difference image data for multiple screens are allocated. The composite digital signal recorded in N bits is reproduced. Reproduction at a normal speed and reproduction at a predetermined fast speed are alternately executed. Expansion means expands a compressed digital video signal separated from the image area of a signal reproduced at the normal speed. Output means repeatedly outputs expanded image data for one screen.

According to a still another aspect of a recording and reproducing method of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. The digital video signal is allocated in the image area in each compression reference period in such a way that reference image data for one screen is allocated first, then difference image data for multiple screens are allocated. That area where difference compressed image data for multiple screens are to be allocated is changed in accordance with the amount of data, and data indicating the change is allocated in the control area. The composite digital signal recorded in N bits is reproduced.

According to a still additional aspect of a recording and reproducing apparatus of the present invention, an N-parallel-bit composite digital signal is formed by an image area, an audio area and a control area. Compressed digital video signals for multiple screens that constitute a dynamic picture are allocated in the image area in each compression reference period. A digital audio signal in each compression reference period is allocated in the audio area in that compression reference period. The composite digital signal recorded in N bits is reproduced. A normal reproduction mode in a predetermined number of compression reference periods and a reproduction pause mode in M periods (M: an integer equal to or greater than 1) of the predetermined number of compression reference periods are alternately executed. Expansion means expands a compressed digital video signal separated from the image area of a signal reproduced in the normal reproduction mode in the predetermined number of compression reference periods. Output means outputs expanded image data for each screen repeatedly by (M+1) times.

According to one aspect of a dubbing apparatus of the present invention, a composite digital signal recorded in N-parallel-bit composite, an image area, an audio area and a control area being formed by part of N bits, compressed digital video signals for multiple screens constituting a dynamic picture and allocated in the image area in each compression reference period a digital audio signal in each compression reference period allocated in the audio area in that compression reference period, and sync codes allocated at predetermined intervals in the control area in each compression reference period, are reproduced from a first recording medium and are recorded on another recording medium. Detecting means detects the sync codes from the control area of the signal reproduced from the first recording medium. Control means controls a period for recording the signal on the another recording medium based on the sync codes.

According to another aspect of a dubbing apparatus of the present invention, a composite digital signal recorded in N-parallel-bit composite, an image area, an audio area and a control area being formed by part of N bits, compressed digital video signals for multiple screens constituting a dynamic picture and allocated in the image area in each compression reference period, a digital audio signal in each compression reference period allocated in the audio area in that compression reference period, and a time code allocated at predetermined intervals in the control area in each compression reference period, are reproduced from a first recording medium and are recorded on another recording medium. Detecting means detects the time code from the control area of the signal reproduced from the first recording medium. Control means controls a period for recording the signal on the another recording medium based on the time code.

According to a still further aspect of a recording and reproducing method of the present invention, an N-parallel-bit composite digital signal is formed by an image area, an audio area and a control area. A dynamic picture area and a still picture area are selectively formed in the image area. Compressed digital video signals for multiple screens constituting a dynamic picture are sequentially allocated as one unit in the dynamic picture area. The composite digital video signal for one screen constituting a still picture is sequentially allocated as one unit in the still picture image area.

According to the present invention, a digital video signal carrying a great deal of information is compressed to reduce the amount of information for recording and reproduction, and at the same time, the information as to how the signal has been compressed is recorded and reproduced. This makes it possible to concurrently record or reproduce the digital video signal for a dynamic picture and a digital audio signal without problems.

The objects, advantages and novel features of the present invention will be apparent from the following detailed description when read in conjunction with the appended claims and attached drawings.

BRIEF DESCRIPTION OF THE DRAWINGS

FIGS. 21 and 22 are diagrams exemplifying how the amount of difference compressed image data changes;

DETAILED DESCRIPTION OF THE PREFERRED EMBODIMENT

A preferred embodiment of the present invention will now be described referring to the accompanying drawings. In this embodiment, a DAT is exemplified as a recording and reproducing apparatus.

Figure 2:
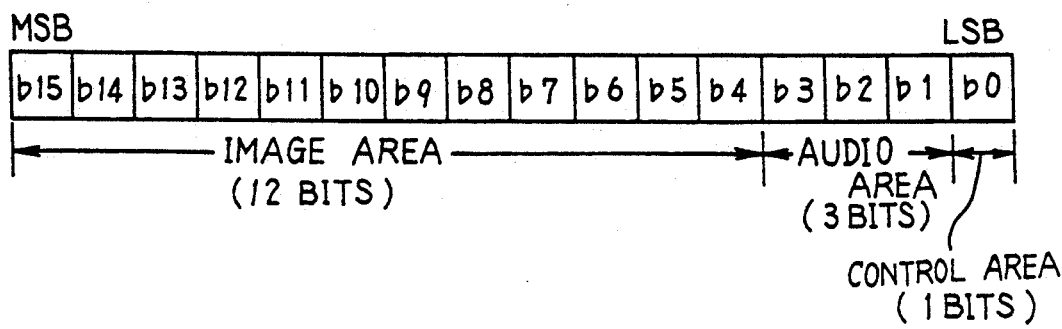
FIGS. 2 to 6 are diagrams illustrating record data.

FIG. 2 shows the format of a digital signal to be recorded and reproduced in the embodiment. Among 16 bits (b15–b0), bits b15–b4 are regarded as an image area, bits b3–b1 as an audio area, and bit b0 as a control area.

When the conventional audio sampling clock is set to 48 kHz, and the transfer rate of the DAT is set to 48 kHz×2×16 bits=1536 *kbps* as in the case of recording digital audio signals of both right and left channels, the transfer rate of the image area is 48 kHz×2×12 bits=1152 *kbps*, the transfer rate of the audio area is 48 kHz×2×3 bits=288 *kbps*, and the transfer rate of the control area is 48 kHz×2×1 bit=96 *kbps*

Figure 3:
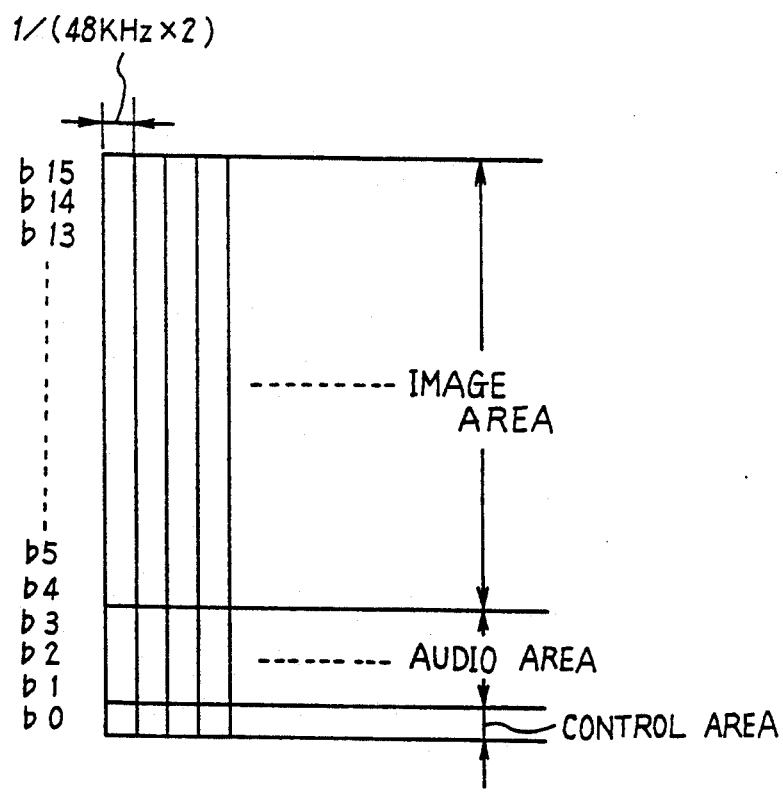

(See FIG. 3.)

Record data is formed with a predetermined period (one second in this embodiment) as a unit period (hereafter referred to as "compression reference period") according to the embodiment. In each compression reference period, the image area has 1152000 bits, the audio area 288000 bits, and the control area 96000 bits.

Video signals in the NTSC system are used in this embodiment, and 30 frames of image data will be put in the image area during the compression reference period. The 30 frames of image data, as they are, contain too much information. For example, when one frame contains pixel data of 256H×240 V, and a brightness signal Y, a red difference signal U, and a blue difference signal V each consist of 8 bits, the amount of information for 30 frames is represented as follows:

256×240×8×30×3=44236800 bits

The 30-frame image data therefore will be compressed within a range of 1152000 bits.

For example, pixel data of 256H×240 V will be reduced to a half by a sub-sampling process. The total bits of the brightness signal Y, the red difference signal U, and the blue difference signal V, 24 bits, are compressed into 9 bits. Information of one frame therefore becomes 256×240×½×9=276480 bits Image data of the second frame to the 29th frame are each considered as difference compressed image data with image data of the first frame taken as reference data. The amount of information in the difference compressed image data is 27200 bits, for example.

The amount of information for 30 frames is then,

276480×1+27200×29=1065280 bits which is within 1152000 bits.

The remaining 86720 bits are used to adjust a fixed length.

Figure 4:
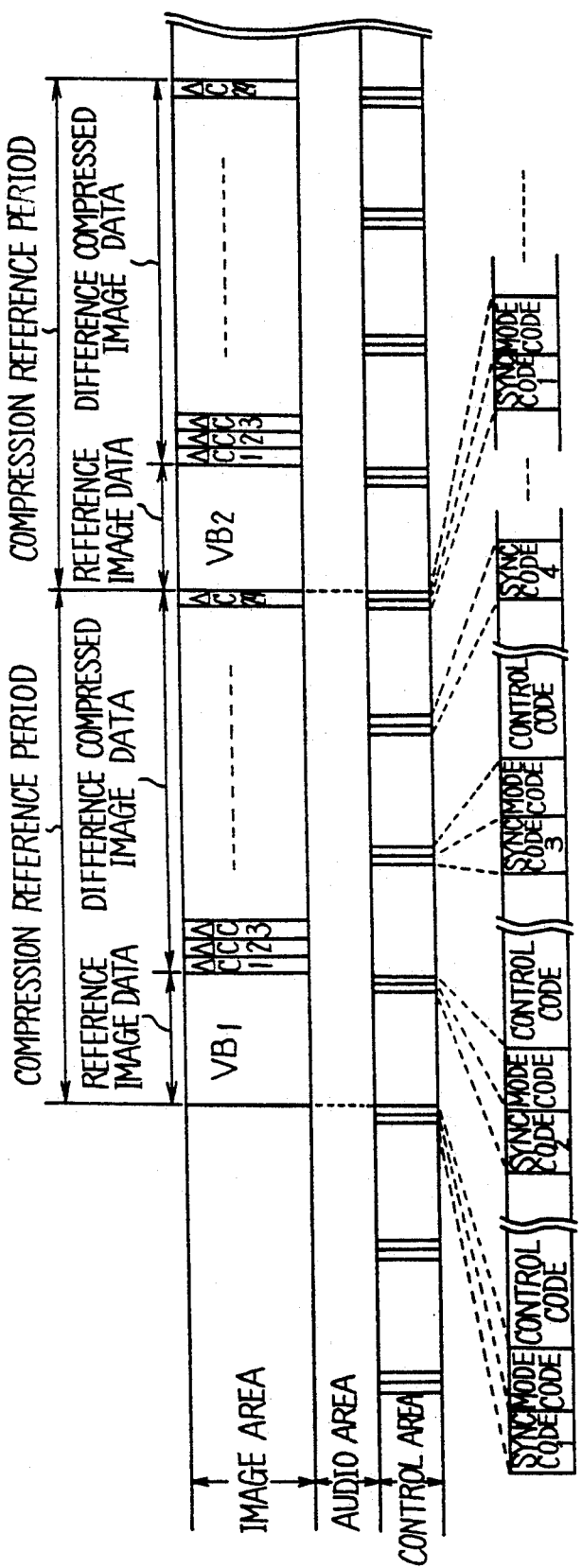

FIG. 4 illustrates an example of the format of record data.

At the head of the image area in every compression reference period, the reference compressed image data, $VB_1, VB_2, \ldots$, that correspond to the image data of the first frame are placed, followed by the difference compressed image data, $\Delta c1, \Delta c2, \ldots \Delta c29$, that correspond to the image data of the respective second to 29th frames.

Audio data for each compression reference period is put in the audio area in that reference period.

Audio data consists of within 288000 bits.

The ADPCM system, for example, is used as a coding system for audio data to compress the data.

When a sampling frequency is 32 kHz, one sample consists of 4 bits, and two channels are involved (stereo or monaural two channels), the amount of information is 32 kHz×4 bits×2 channels=256000 bits That is, the data has been compressed to contain less than 288000 bits.

The remaining 32000 bits are empty and are used to adjust the bit rate.

As described above, the audio area is formed of three bits $b3-b1$ out of 16 bits $b15-b0$ of a digital signal. The transfer rate for this area is 96 kHz×3 bits=288 kbps (see FIGS. 2 and 3).

Figure 5:
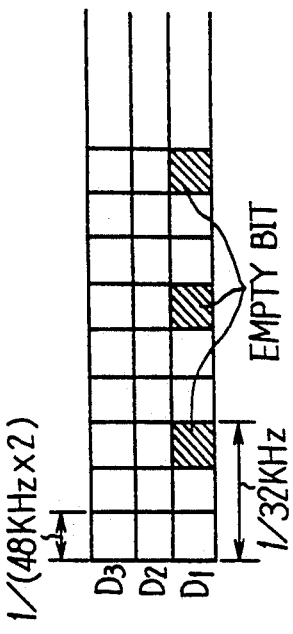

This rate can also be expressed as 32 kHz×9 bits=288 kbps. For example, as shown in FIG. 5, audio data is placed in 8 bits of every 9 bits and the remaining 1 bit is empty and is used to adjust the bit rate. In other words, 32 kHz×8 bits=256 kbps.

The control area in each compression reference period includes sync code portions, mode code portions, and control code portions.

These are multiple sync code portions provided in each compression reference period; four sync code portions are arranged at 0.25-sec intervals in this embodiment. In each sync code portion is secured an area of, for example, 64×1 bits. A framing code is used as a sync code, and the four sync code portions respectively have different types of sync codes 1-4.

As shown in FIG. 4, the sync code portion, which corresponds to immediately before the next compression reference period, is given the sync code 1. The other previously-located, three sync code portions are given the sync codes 4-2, respectively.

Each mode code portion follows the associated sync code portion; four mode code portions are provided at 0.25-sec intervals. In each mode code portion, an area of 64×1 bits is secured.

In this case, the end of the mode code portion that follows the sync code portion with the sync code 1 comes to the beginning of the next compression reference period.

The same data is put in the four mode code portions in each compression reference period. The mode code portion contains data concerned with image data, audio data and the like to be provided in the next compression reference period.

The following are possible data relating to image data:

(1) Resolution data
256H×240 V
512H×480 V
768H×480 V
etc.
(2) Frame data
30 frames/sec
24 frames/sec
20 frames/sec
10 frames/sec
etc.
(3) Data about signal type brightness signal Y, red difference signal U, blue difference signal V, red signal R, green signal G, blue signal B etc.

(4) Bit data 24 bits (8[Y,R]+8[U,G]+8[V,B])

16 bits (6[Y]+5[U]+5[V])

9 bits (compressed data of Y, U and V, or R, G and B) etc.

The following are possible data concerning audio data:

(1) Data about the coding system
ADPCM
   PCM (linear)
   PCM (nonlinear)
etc.

(2) Bit data
4 bits, 6 bits, 8 bits, 10 bits, 12 bits, 16 bits, etc.

(3) Data about the sampling frequency
16 kHz, 32 kHz, 44.1 kHz, 48 kHz, etc.

(4) Data about the number of channels
one channel, two channels, etc.

The mode code portion contains data indicating the presence of a scene change besides the aforementioned data concerning image data and audio data, when there is a scene change in the next compression reference period, as will be described later.

Each control code portion follows the associated mode code portion, i.e., four control code portions are provided in each compression reference period. An area of 23136×1 bits is secured in each control code portion.

The same data is allocated in the four control code portions in each compression reference period. The control code portion contains a micro code for expansion of image data to be allocated in the next compression reference period, making it possible to cope with any compression system at the time of reproduction.

Although not shown in FIG. 4, there is a guard area of 736 bits, each bit set to "0", provided between the control code portion and the sync code portion.

As described above, because the four mode code portions have the same data allocated therein, so do the four control code portions, the mode code and control code can efficiently be acquired wherever reproduction starts. It is therefore possible to smoothly control the operation of a processing system for reproduced signals as will be described later.

Figure 6:
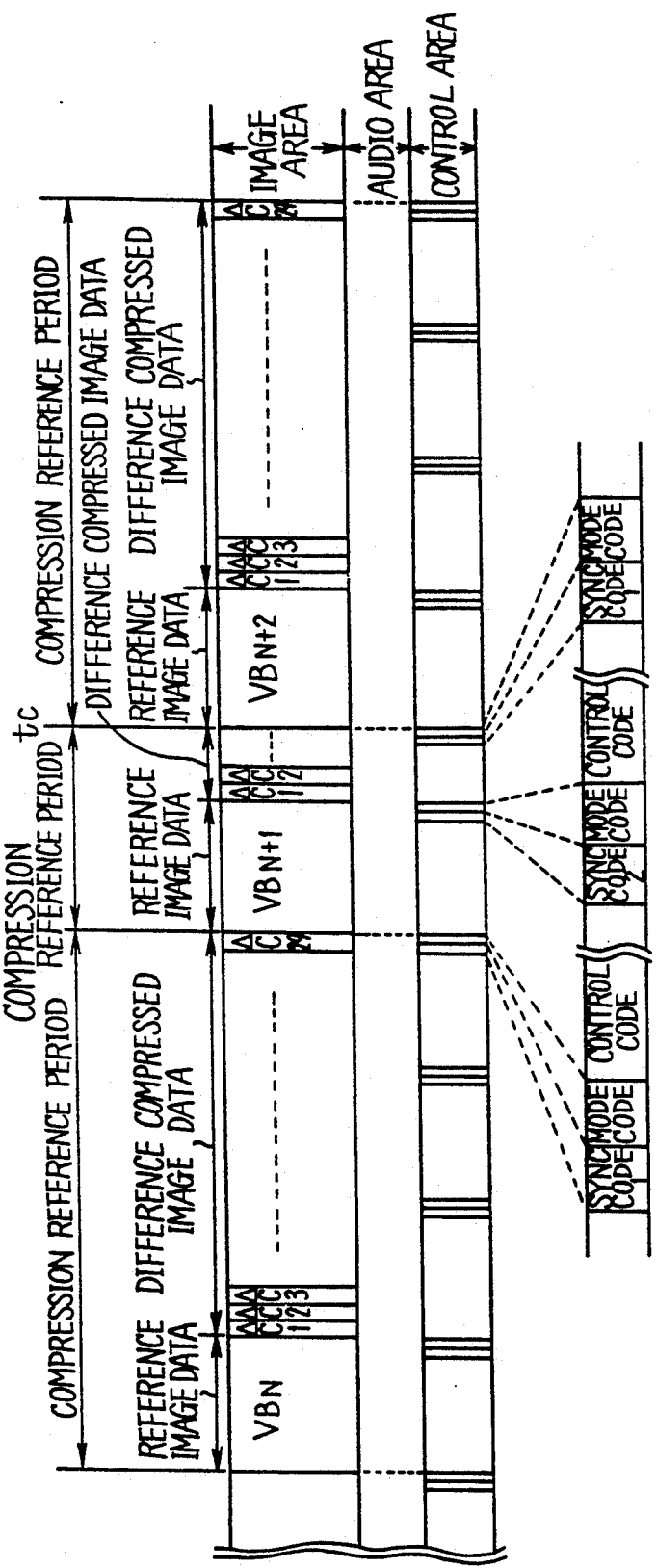

FIG. 6 illustrates the structure of record data in the case where a scene change occurs.

When a scene change occurs, the recording state of image data is reset in a midway in the compression reference period (refer to a point tc in FIG. 6). In other words, starting at the point tc, the reference image data $VB_{N+2}$ after the scene change and the difference compressed image data $\Delta c1, \Delta c2, \ldots$ are recorded one after another in the image area.

Further, the data recording state in the control area is also reset accordingly, and the sync code portion having the sync code 1 is placed immediately before the reference image data $VB_{N+2}$. Data indicating the presence of the scene change is allocated in the mode code portion in the compression reference period coming before the scene change.

Figure 1A:
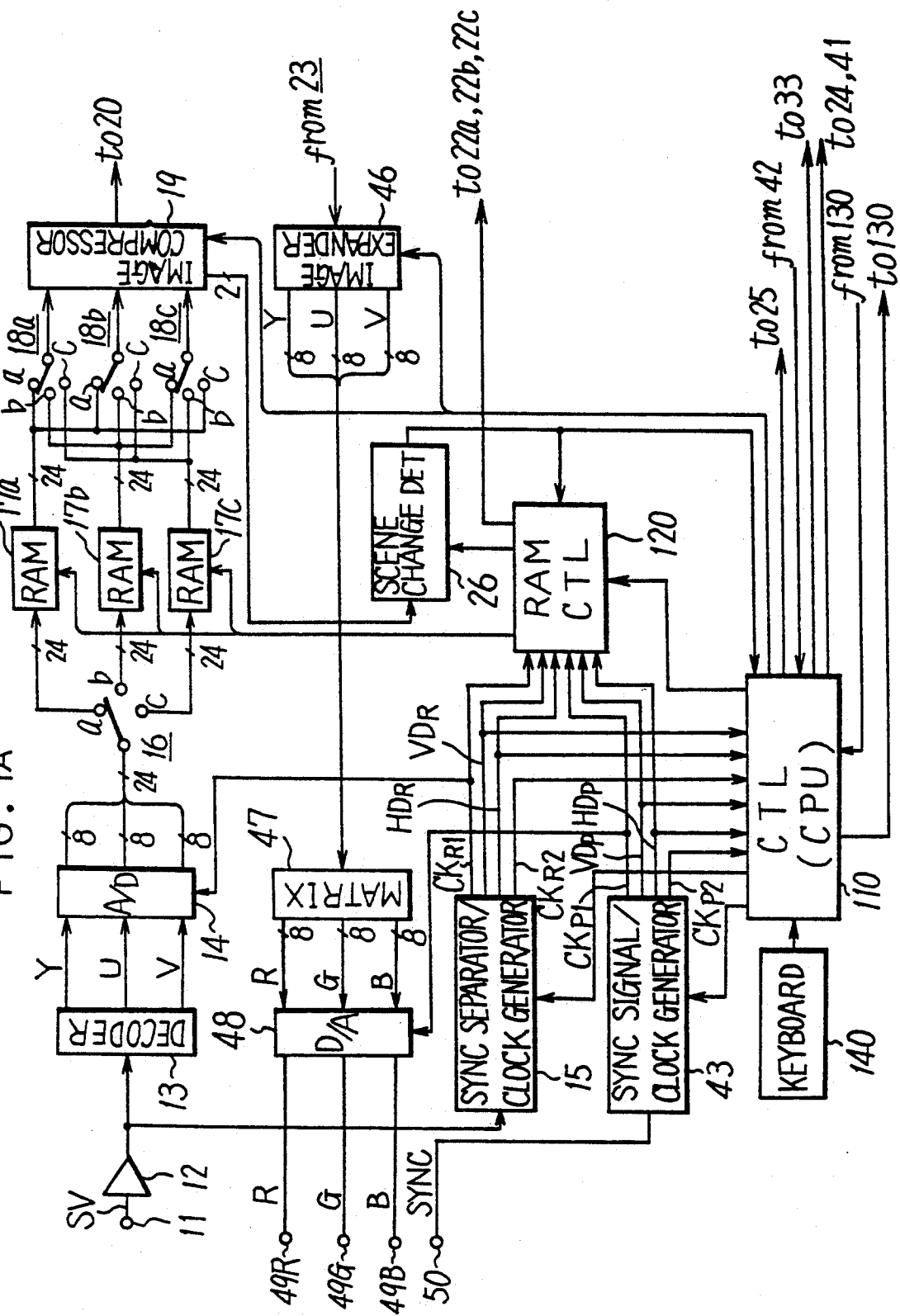
FIGS. 1A and 1B are block diagrams illustrating one embodiment of a signal processor according to the present invention.
Figure 1B:
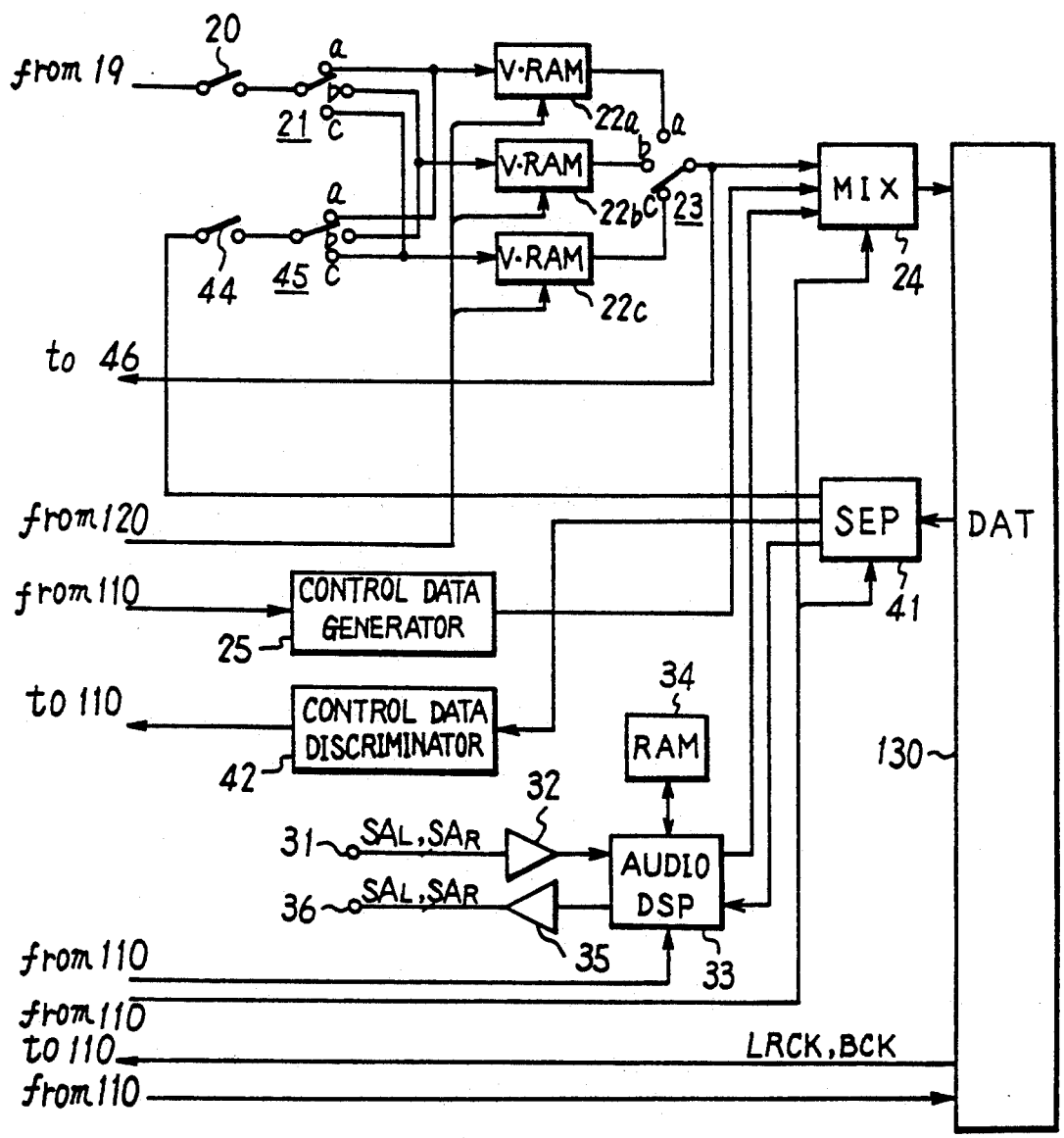

FIGS. 1A and 1B exemplify a signal processor that is used when the DAT records and reproduces the record data as shown in FIGS. 4 and 6.

The recording system of the processor will be explained first.

A color video signal SV of the NTSC system sent to a video-in terminal 11 is amplified by an amplifier 12. The amplified signal is then supplied to a decoder 13. The decoder 13 sends a brightness signal Y, red difference signal U, and blue difference signal V to an A/D converter 14.

The video signal SV from the amplifier 12 is also supplied to a sync separator/clock generator 15. This circuit 15 then outputs a clock $CK_{R1}$ having a frequency of 8 fsc/3 (fsc: color subcarrier frequency of 3.58 MHz) in synchronism with a sync signal for the video signal SV. This clock $CK_{R1}$ is supplied as a sampling clock to the A/D converter 14.

The A/D converter 14 samples the signals Y, U, and V so that the number of samples per effective horizontal period is 256 samples, and converts the signals to digital signals with one sample consisting of 8 bits.

The signals Y, U and V from the A/D converter 14 are sent to a movable terminal of a selection switch 16. Although a control line is not shown, the selection switch 16 is driven under the control of a controller 110 including a CPU; the switch 16 is switched in order to the side a, b, c, a, ... at the end of each frame period.

The selection switch 16 has fixed terminals on the sides a–c connected to the input terminals of the respective RAMs 17a–17c. A RAM controller 120 controls write and read access to the RAMs 17a–17c. The operation of the RAM controller 120 is under the control of the controller 110.

The RAM controller 120 receives the clock $CK_{R1}$ from the clock generator 15 as well as a vertical sync signal $VD_R$ and a horizontal sync signal $HD_R$, both as reference sync signals. The controller 110 receives a clock $CK_{R2}$ having a frequency of 8 fsc as a master clock from the generator 15, and the vertical sync signal $VD_R$ and the horizontal sync signal $HD_R$ as reference sync signals.

Figure 7:
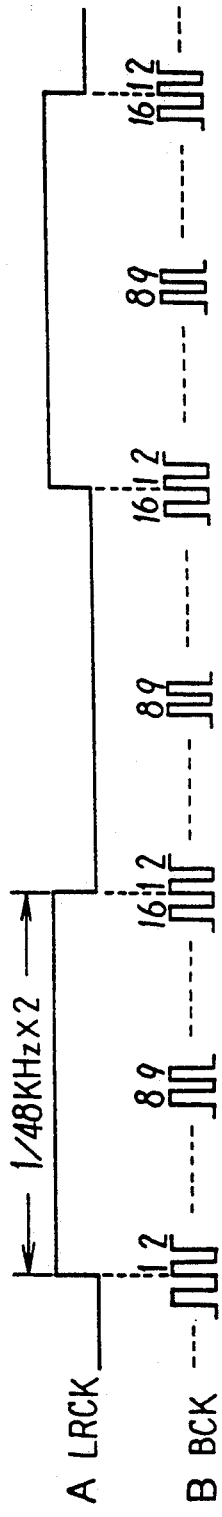
FIG. 7 is a diagram illustrating a reference clock from a DAT.

The controller 110 receives a bit clock BCK (see B in FIG. 7) and a clock LRCK (see A in FIG. 7) for selection of right and left channels from a DAT 130. Both clocks serve as reference clocks to match the timing with the DAT 130.

The controller 110 controls the operation of the DAT 130.

In the RAMs 17a–17c are written sample data, 256 pieces horizontal and 240 pieces vertical, for each of the signals Y, U, and V during one frame period in which the RAMs 17a–17c are respectively connected to the terminals a–c of the selection switches 16. The 256H×240 V data relating to all the signals, Y, U and V written in the RAMs 17a–17c are read twice in the following two frame periods.

A signal read from the RAM 17a is sent to fixed terminals a, a and c of respective selection switches 18a, 18b and 18c. A signal read from the RAM 17b is sent to fixed terminals b, b and a of the respective selection switches 18a, 18b and 18c. A signal read from the RAM 17c is supplied to fixed terminals c, c and b of the respective selection switches 18a, 18b and 18c.

Although a control line is not shown, the selection switches 18a–18c are driven under the control of the controller 110. The selection switches 18a-18c are connected and switched in order to the side c, a, b, c, ... when the selection switch 16 is connected and switched in order to the side a, b, c, a, ... at the end of each frame period.

In this case, a signal of the same frame is output from the selection switches 18a and 18b and at the same time a 1 frame-delayed signal is output from the selection switch 18c. As explained hereinafter, the output signal of the selection switch 18a is used to form image data and on the other hand the output signals of the selection switches 18b and 18c are used to judge a scene change.

Output signals from the selection switches 18a-18c are sent to an image compressor 19, which is controlled by the controller 110.

The image compressor 19 performs the following process on the image data of the first frame among the 30-frame image data constituting each compression reference period (one second). First, the sampling is performed, and the number of the samples per frame concerning each of the signals Y, U and V is divided by 2. Then 24-bit data is compressed into 9-bit data, thus forming the reference image data $VB_N$.

The image data of the second to 30th frames are processed as follows. First, the sampling is performed, and the number of the samples per frame concerning the signals Y, U and V is set to $\frac{1}{2}$. Then, 24-bit data is compressed into 9-bit data. The difference between this data and the reference image data is calculated to form difference compressed image data $\Delta c1-\Delta c29$.

The reference image data $VB_N$ and the difference compressed image data $\Delta c1-\Delta c29$, formed by the image compressor 19 in each compression reference period, are supplied to video RAMs 22a-22c through a connection switch 20 and a selection switch 21.

Although a control line is not shown, the connection switch 20 and the selection switch 21 are driven under the control of the controller 110. The connection switch 20 is activated at the time of recording, while the selection switch 21 is connected in order to the side a, b, c, a, ... every one frame period.

The RAM controller 120 controls the write and read access to the video RAMs 22a-22c.

In the video RAMs 22a-22c are written the reference image data $VB_N$ and the difference compressed image data $\Delta c1-\Delta c29$, formed in the image compressor 19 during one compression reference period in which the video RAMs 22a-22c are connected to the sides a-c of the selection switch 21.

Those reference image data $VB_N$ and the difference compressed image data $\Delta c1-\Delta c29$ which have been written in the video RAMs 22a-22c are read out during the next compression reference period. These image data are sent through a selection switch 23 to a mixing circuit 24 to be allocated in the image area of the record data.

Although a control line is not shown, the selection switch 23 is driven under the control of the controller 110. The selection switch 23 is connected to the sides a, b and c during the respective periods in which the image data is read from the video RAMs 22a-22c. The operation of the mixing circuit 24 is controlled by the controller 110.

Audio signals $SA_L$ and $SA_R$ from the left and right channels, which are sent to an audio-in terminal 31, are amplified by an amplifier 32. The amplified signals are then supplied to an audio digital signal processor (audio DSP) 33.

The operation of the audio DSP 33 is controlled by the controller 110. The audio DSP 33 samples the audio signals $SA_L$ and $SA_R$ from both channels with a 32-kHz clock, then uses a RAM 34 to encode the signals in the ADPCM system so that one sample consists of four bits. As a result, 256000-bit audio data is produced corresponding to each compression reference period.

The audio data formed in the audio DSP 33 is supplied to the mixing circuit 24 to be allocated in the audio area of the record data, as shown in FIG. 5.

In this case, to avoid the lip sync error the audio data output from the audio DSP 33 is treated while being synchronized with the image data to be supplied to the mixing circuit 24.

A control data generator 25 generates control data, such as sync codes, mode codes and control codes, under the control of the controller 110. The control data from the generator 25 is sent to the mixing circuit 24 to be allocated in the control area of the record data.

The mixing circuit 24 forms record data shown in FIG. 4 in this way. The record data is sent to the DAT 130 and is recorded in the DAT format.

A scene change detector 26 receives signals of consecutive two frames to be supplied to the image compressor 19 through the selection switches 18a-18c. In response to the comparison position signal from the RAM controller 120, data at the multiple sample points are compared with each other to determine if the difference exceeds a specific value. When there are a predetermined number of differences or more which exceed the specific value, it is judged that there is a scene change. A judge signal is sent to the controller 110 and the RAM controller 120.

When a scene change occurs, the signal processing will be reset even during the one-second compression reference period. In other words, the image compressor 19 starts making the reference image data $VB_N$ according to images after the scene change, and the selection switch 21 is also switched to the next video RAM.

The signal processing in the audio system is reset as in the video system. The operation of the control data generator 25 is controlled, so that the timing of sync code generation is controlled, or data indicating the presence of a scene change is allocated in the mode code in the compression reference period before the scene change.

When there is a scene change, the mixing circuit 24 forms record data shown in FIG. 6, then sends it to the DAT 130. The record data is recorded in the DAT format.

Figure 8:
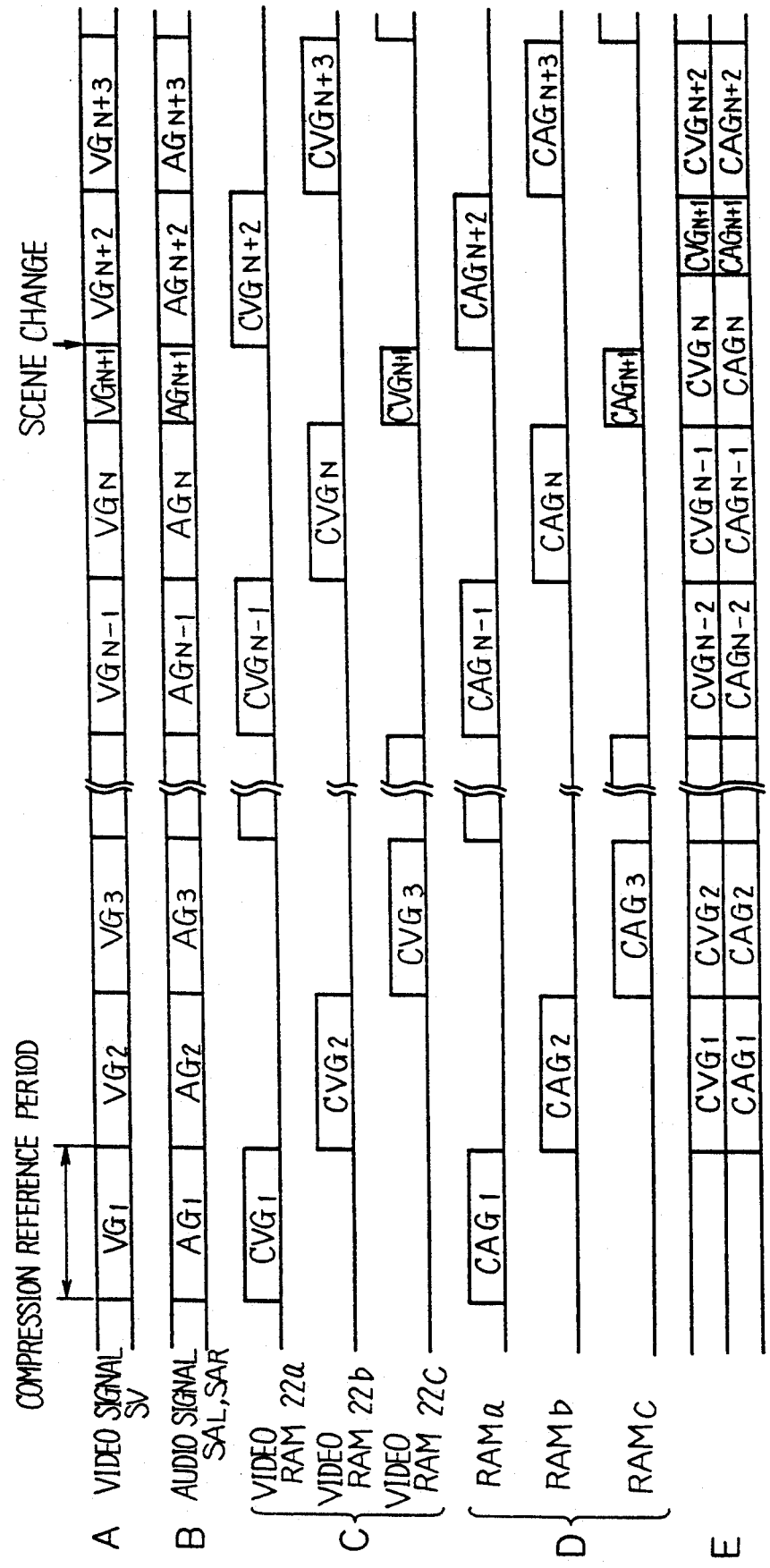
FIG. 8 is a diagram illustrating the timing of processing an image and a voice for a recording system.

FIG. 8 presents a timing chart for the recording system concerning a video signal and an audio signal.

A and B in this diagram respectively represent the video signal SV and audio signals $SA_L$ and $SA_R$, the first signal supplied to the terminal 11 and the latter two to the terminal 31. $VG_1, VG_2, \ldots$ and $AG_1, AG_2, \ldots$ indicate video signals and audio signals in the individual compression reference periods.

Compressed image data $CVG_1, CVG_2, \ldots$ that are compressed by the image compressor 19 are written one after another in the video RAMs 22a to 22c, as indicated by C in the diagram.

Further, the RAM 34, has areas a-c corresponding to each of the video RAMs 22a-22c, though not described above. Compressed audio data $CAG_1, CAG_2, \ldots$ which are encoded in the ADPCM system by the audio DSP 33, are written sequentially in the RAM 34, as indicated by D in FIG. 8.

Accordingly, a video signal and an audio signal are processed at the same timing, the compressed image data $CVG_1$, $CVG_2$, ... and the respective compressed audio data $CAG_1$, $CAG_2$, ... during the individual compression reference periods are recorded in the DAT 130 (refer to E in FIG. 8) even when there is a scene change.

The reproducing system will now be described.

Data reproduced by the DAT 130, as shown in FIGS. 4 and 6, are sent to a separator 41. The separator 41 separates image data, audio data, and control data from the reproduced data under the control of the controller 110.

The control data from a control area (1 bit) which is separated by the separator 41 is supplied to a control data discriminator 42. The discriminator 42 discriminates sync codes, and subsequent mode codes and control codes, sending the judged results, i.e. sync data, mode data etc. to the controller 110. Under the control of the controller 110 based on the sync data, mode data etc., the signal reproducing system including an image expander 46 (to be described later) and the audio DSP 33 processes the reproduced image data and audio data are processed in accordance with their formats and compressing systems.

It is therefore possible to cope with image data and audio data to be reproduced, in whatever format or however compressed. The following description involves the case of reproduced data as shown in FIG. 4 or 6.

A sync signal/clock generator 43 is controlled by the controller 110. The generator 43 outputs a clock $CK_{P1}$ with a frequency of 4 fsc/3, a vertical sync signal $VD_P$, a horizontal sync signal $HD_P$ and a clock $CK_{P2}$ with a frequency of 8 fsc.

The RAM controller 120 receives the clock $CK_{P1}$ from the clock generator 43 as well as a vertical sync signal $VD_P$ and a horizontal sync signal $HD_P$, both as reference sync signals. The controller 110 receives a clock $CK_{P2}$ having a frequency of 8 fsc as a master clock from the generator 43, and the vertical sync signal $VD_P$ and the horizontal sync signal $HD_P$ as reference sync signals.

The reference image data $VB_N$ and the difference compressed image data $\Delta c1-\Delta c29$ in each compression reference period, which are separated by the separator 41, are supplied to video RAMs 22a-22c through a connection switch 44 and a selection switch 45.

Although a control line is not shown, the connection switch 44 and the selection switch 45 are driven under the control of the controller 110. The connection switch 44 is activated at the reproducing time, while the selection switch 45 is connected in order to the side a, b, c, a, ... every one frame period.

The RAM controller 120 controls the write and read access to the video RAMs 22a-22c.

In the video RAMs 22a-22c are written the reference image data $VB_N$ and the difference compressed image data $\Delta c1-\Delta c29$, separated by the separator 41 during one compression reference period in which the video RAMs 22a-22c are connected to the sides a-c of the selection switch 45.

Those reference image data $VB_N$ and the difference compressed image data $\Delta c1-\Delta c29$ which have been written in the video RAMs 22a-22c are read out during the next compression reference period.

These image data are sent through the selection switch 23 to the image expander 46. Although the control line is not shown, the selection switch 23 is driven under the control of the controller 110. The selection switch 23 is connected to the sides a, b and c during the respective periods in which the image data is read from the video RAMs 22a-22c.

The image expander 46 is controlled by the controller 110 based on the control code, and performs opposite processing to that of the image compressor 19.

The image expander 46 executes the following processing on the reference image data $VB_N$. First, 9-bit data is expanded to provide 8-bit signals Y, U and V. Then, the image expander 46 executes an interpolation process to double the number of samples per frame for each of the signals Y, U and V, thereby forming image data of the first frame.

With regard to difference compressed image data $\Delta c1-\Delta c29$, the image expander 46 performs the following processing. First, difference data is restored to 9-bit data using the reference image data. Then, the 9-bit data is expanded to provide 8-bit signals Y, U and V. The image expander 46 then executes an interpolation process to double the number of samples per frame for each of the signals Y, U and V, thereby forming image data of the second frame to 30th frame.

The signals Y, U and V from the image expander 46 are supplied to a matrix circuit 47. Primary color signals R, G and B output from the matrix circuit 47 are supplied to a D/A converter 48, which is supplied with the clock $CK_{P1}$ from the generator 43. The D/A converter 48 outputs analog primary color signals R, G and B to video-out terminals 49R, 49G and 49B, respectively.

A terminal 50 serves as an output terminal for a sync code. To this terminal 50 is supplied a decoded sync code SYNC from the generator 43.

Audio data separated by the separator 41 is supplied to the audio DSP 33 where an ADPCM signal is demodulated. Left and right audio signals $SA_L$ and $SA_R$ from the audio DSP 33 are sent via an amplifier 35 to an audio-out terminal 36.

When there is a scene change, the signal processing is resent even during the one-second compression reference period. That is, the selection switch 45 is switched to start data writing in the next video RAM. With regard to the processing done after the one compression reference period by the image expander 46, formation of the image data for the first frame from the reference image data after the scene change starts.

The signal processing in the audio system will be reset in the same manner as in the video system.

Figure 9:
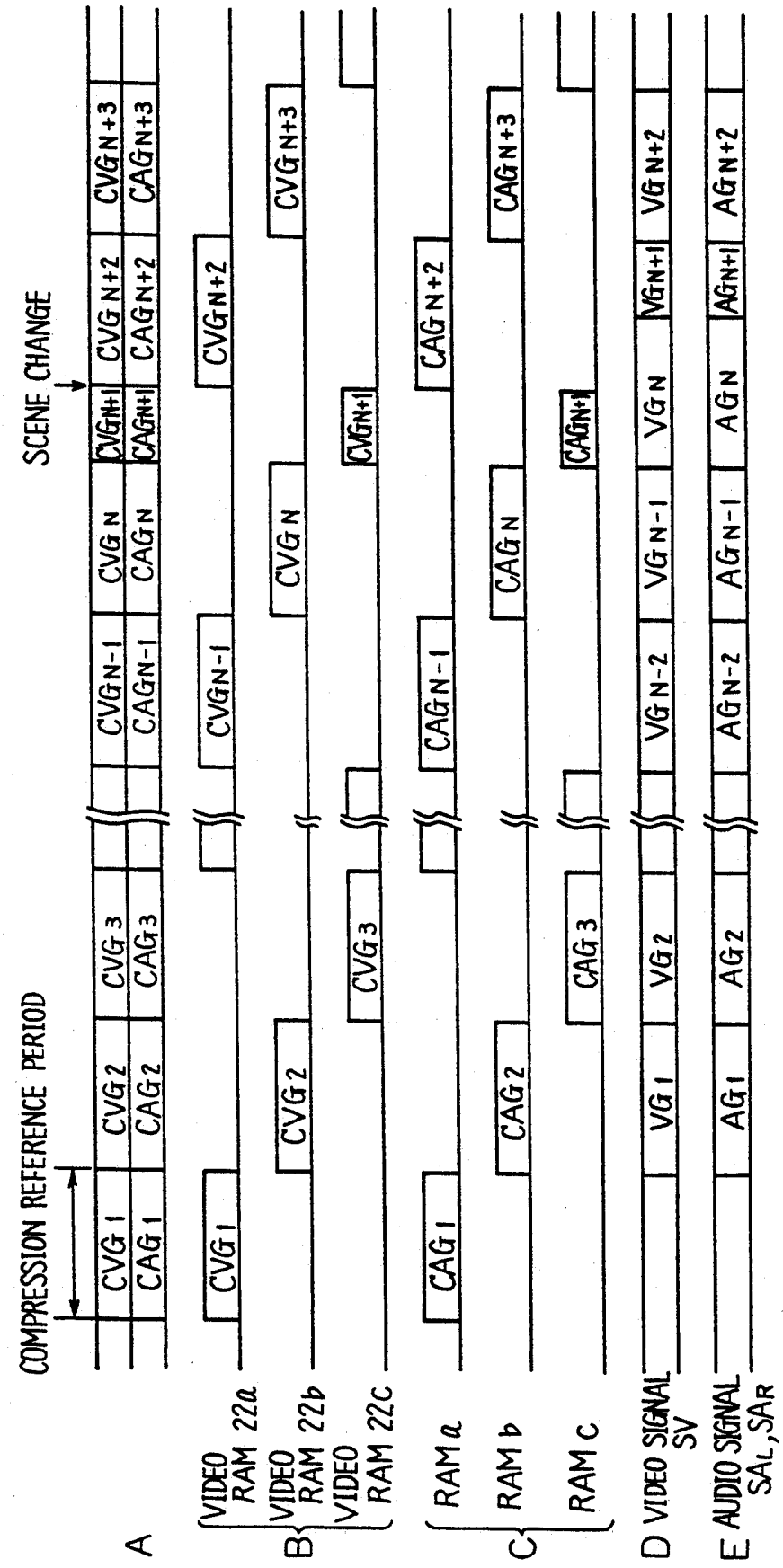
FIG. 9 is a diagram illustrating the timing of processing an image and a voice for a reproducing system.

FIG. 9 illustrates a timing chart for the reproducing system about video signals and audio signals.

Compressed image data in each compression reference period, $CVG_1$, $CVG_2$, ... and compressed audio data $CAG_1$, $CAG_2$, ... are reproduced in association with each other from the DAT 130. (See A in FIG. 9.)

Reproduced, compressed image data $CVG_1$, $CVG_2$, ... are written one after another in the video RAMs 22a to 22c, as indicated by B in the diagram.

Further, in the RAMs a-c of the RAM 34 are sequentially written compressed audio data $CAG_1$, $CAG_2$, ... as indicated by C in FIG. 9.

In this manner, the compressed image data and compressed audio data are processed simultaneously, synchronous to one other within a compression reference period. The video signals $VG_1$, $VG_2$, ... and the audio signals $AG_1$, $AG_2$, ... during the individual compression reference periods are sent in association with each other to the terminals 49R, 49G, 49B and 36 (refer to D and E in FIG. 9).

Figure 10:
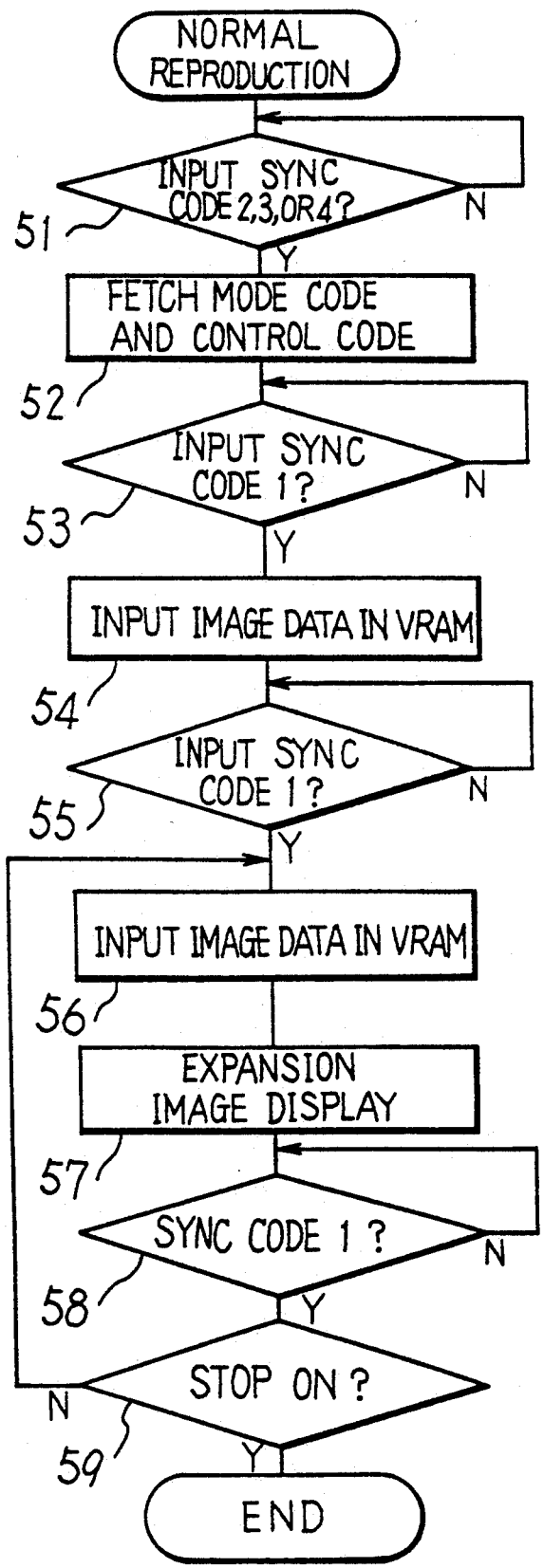
FIG. 10 is a flow chart of the operation in normal reproduction mode.

FIG. 10 is a flow chart illustrating the operation of the video system in normal reproduction mode.

Referring to this diagram, when the play key on a keyboard 140 is set on, it is discriminated in step 51 whether or not the sync code 2, 3 or 4 has been input.

When any of the sync codes has been input, a mode code and a control code following the sync code are fetched in the control area, and the image expander 46 and the like are set to perform an operation associated with compressed image data to be reproduced in step 52.

Then, it is discriminated in step 53 whether or not the sync code 1 has been input. When the sync code 1 has been input, inputting compressed image data for one compression reference period in any video RAM (video RAMs 22a-22c being sequentially used) starts in step 54.

In the next step 55, it is discriminated whether or not the sync code 1 related to the next compression reference period has been input. When the sync code 1 has been input, inputting compressed image data for one compression reference period in the next video RAM starts in step 56.

In the subsequent step 57, the compressed image data written in the video RAM in the previous compression reference period is sequentially read out, then a process of expanding the read data starts in the image expander 46. An image is then displayed on a monitor (not shown) connected to the terminals 49R, 49G and 49B.

Then, it is discriminated in step 58 whether or not the sync code 1 has been input. When the sync code 1 has been input, it is discriminated whether or not the stop key on the keyboard 140 is set on in step 59.

When the stop key is not set on, the flow returns to step 56 and the above-described operation will be repeated. When the stop key is set on, on the other hand, the reproducing operation is stopped.

The expanding process in step 57 enters processing for the next compression reference period after the expanding process of the compressed image data written in the video RAMs 22a-22c in the previous compression reference period is completed.

When a scene change occurs in a midway, while compressed image data in one compression reference period is read out from one video RAM and subjected to expansion, writing compressed image data in the other two video RAMs is executed (refer to the scene change portions in C and D in FIG. 9). More specifically, compressed image data (CVG$_{N+1}$) before the scene change is written in one of the two video RAMs, while compressed image data (CVG$_{N+2}$) after the scene change is written in the other video RAM. In this respect, three video RAMs 22a-22c are used.

Though not described above, Intel 82750PB, compressing/expanding IC, may be used as an IC for executing the compressing process in the image compressor 19 and the expanding process in the image expander 46.

Special reproduction modes, such as still reproduction and strobe reproduction, will be described below.

To begin with, the still reproduction will be discussed. The tape running speed for reproduction in still reproduction mode is the same as the speed in normal reproduction mode.

Figure 11:
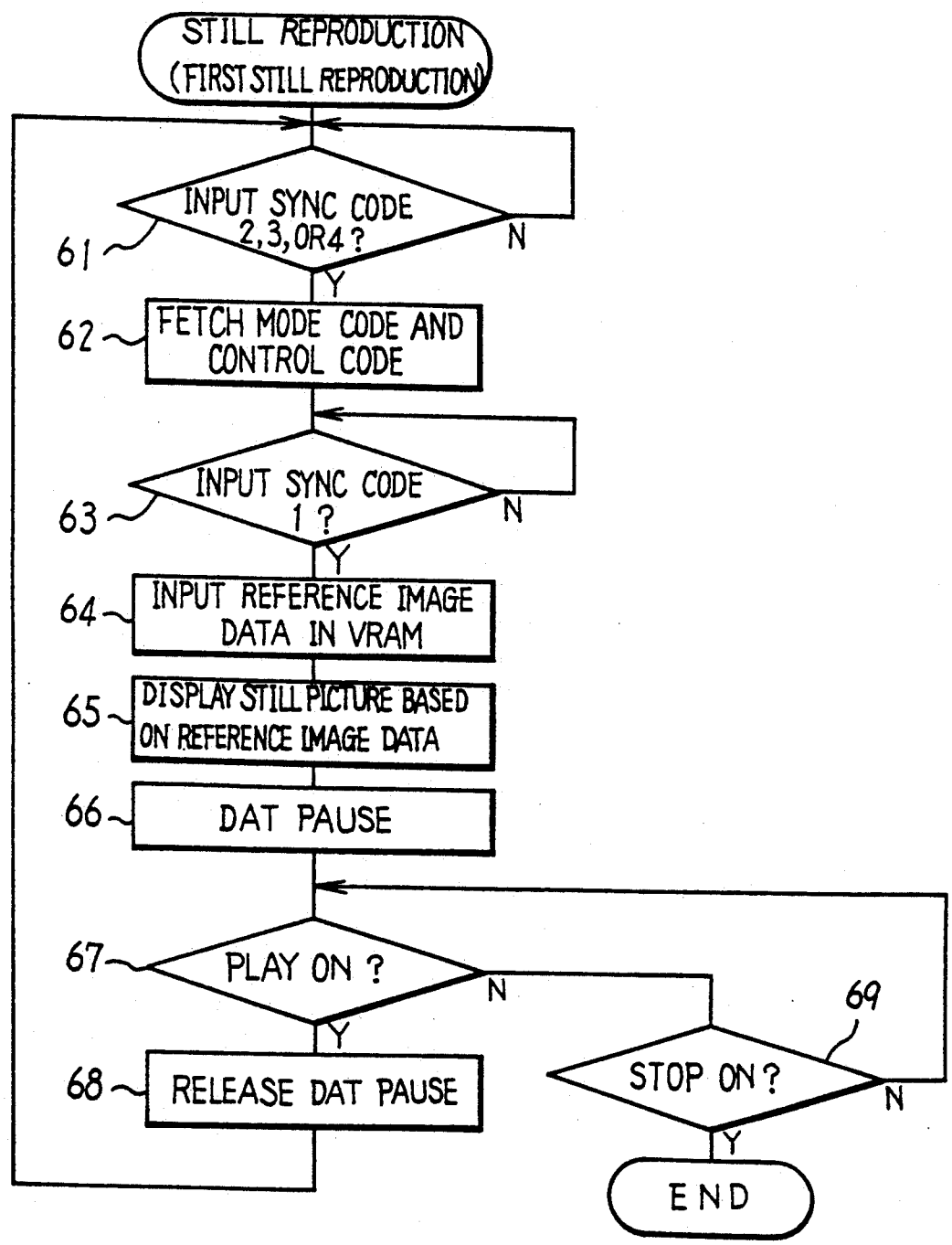
FIGS. 11 to 15 are flow charts showing the operation of still reproduction.

FIG. 11 is a flow chart illustrating the operation of the still reproduction (first still reproduction) for sequentially displaying still pictures based on the reference image data through a manual operation.

Referring to this diagram, when the first still reproduction is selected through the operation of the keyboard 140, it is discriminated in step 61 whether or not the sync code 2, 3 or 4 has been input.

When any of the sync codes has been input, a mode code and a control code following the sync code are fetched in the control area, and the image expander 46 and the like are set to perform an operation associated with compressed image data to be reproduced in step 62.

It is discriminated in the next step 63 whether or not the sync code 1 has been input. When the sync code 1 has been input, reference image data is written in any video RAM (video RAMs 22a-22c being sequentially used) which is selected by the selection switch 45 such writing starts in step 64.

In the subsequent step 65, the reference image data is read out from the video RAM, then is expanded by the image expander 46 to form image data for one frame, and this one-frame image data is stored in a memory provided in the image expander 46. The one-frame image data is repeatedly read out from this memory, whereby still pictures based on the reference image data are displayed on the monitor connected to the terminals 49R-49B.

In the next step 66, the DAT 130 is set to the play pause.

Then, it is discriminated whether or not the play key on the keyboard 140 is set on in step 67. When this key is on, the play pause of the DAT 130 is released in step 68, then the flow returns to step 61. Through the same operation described above, still pictures based on the reference image data in the next compression reference period will be displayed.

When the play key is not detected on in step 67, it is discriminated whether or not the stop key on the keyboard 140 is set on in step 69. When the stop key is not on, the flow returns to step 67.

When the stop key is judged to be on in step 69, the first still reproduction is terminated.

Figure 12:
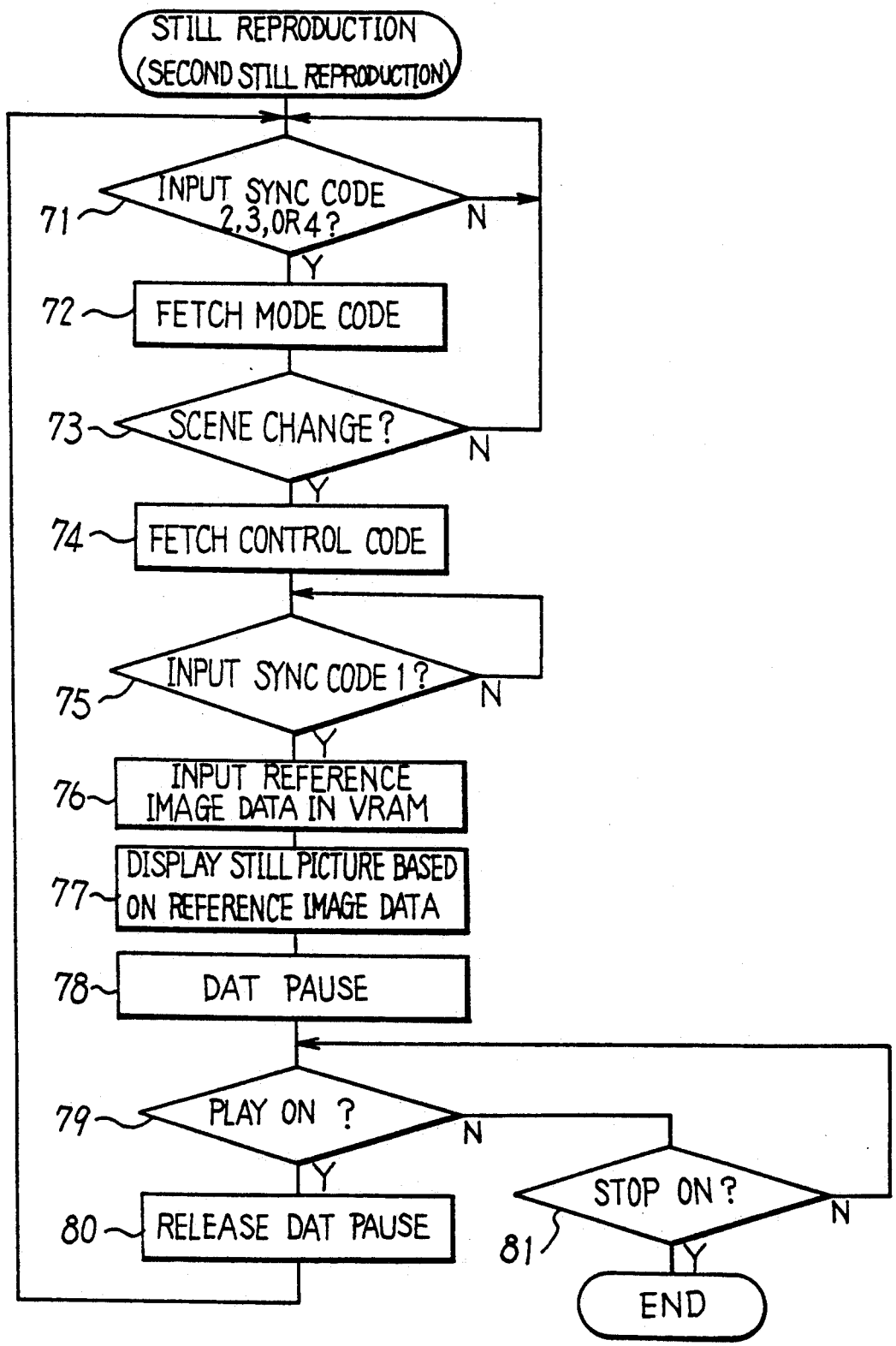

FIG. 12 is a flow chart illustrating the operation of the still reproduction (second still reproduction) for sequentially displaying still pictures based on the reference image data after a scene change through a manual operation.

Referring to this diagram, when the second still reproduction is selected through the operation of the keyboard 140, it is discriminated in step 71 whether or not the sync code 2, 3 or 4 has been input.

When any of the sync codes has been input, a mode code and a control code following the sync code are fetched in the control area in step 72. In the next step 73, it is discriminated whether or not a scene change is present based on data in the mode code, which represents occurrence/non-occurrence of a scene change. When there is no scene change, the flow returns to step 71.

When there is a scene change, the control code following the mode code is fetched in step 74. Based on the mode code and control code, the image expander 46 and the like are set to perform an operation associated with the compressed image data to be reproduced.

It is discriminated in the next step 75 whether or not the sync code 1 has been input. When the sync code 1 has been input, reference image data after the scene change is written in any video RAM (video RAMs $22a-22c$ being sequentially used) such writing starts in step 76.

In the subsequent step 77, the reference image data is read out from the video RAM, then is expanded by the image expander 46 to form image data for one frame, and this one-frame image data is stored in a memory. The one-frame image data is repeatedly read out from this memory, whereby still pictures based on the reference image data immediately after the scene change are displayed on the monitor connected to the terminals 49R–49B.

In the next step 78, the DAT 130 is set to the play pause.

Then, it is discriminated whether or not the play key on the keyboard 140 is set on in step 79. When this key is on, the play pause of the DAT 130 is released in step 80, then the flow returns to step 71. Through the same operation described above, still pictures based on the reference image data immediately after the next scene change will be displayed.

When it is not detected that the play key has been set on in step 79, it is discriminated whether or not the stop key on the keyboard 140 is set on in step 81. When the stop key is not on, the flow returns to step 79.

When the stop key is judged to be on in step 81, the second still reproduction is terminated.

Figure 13:
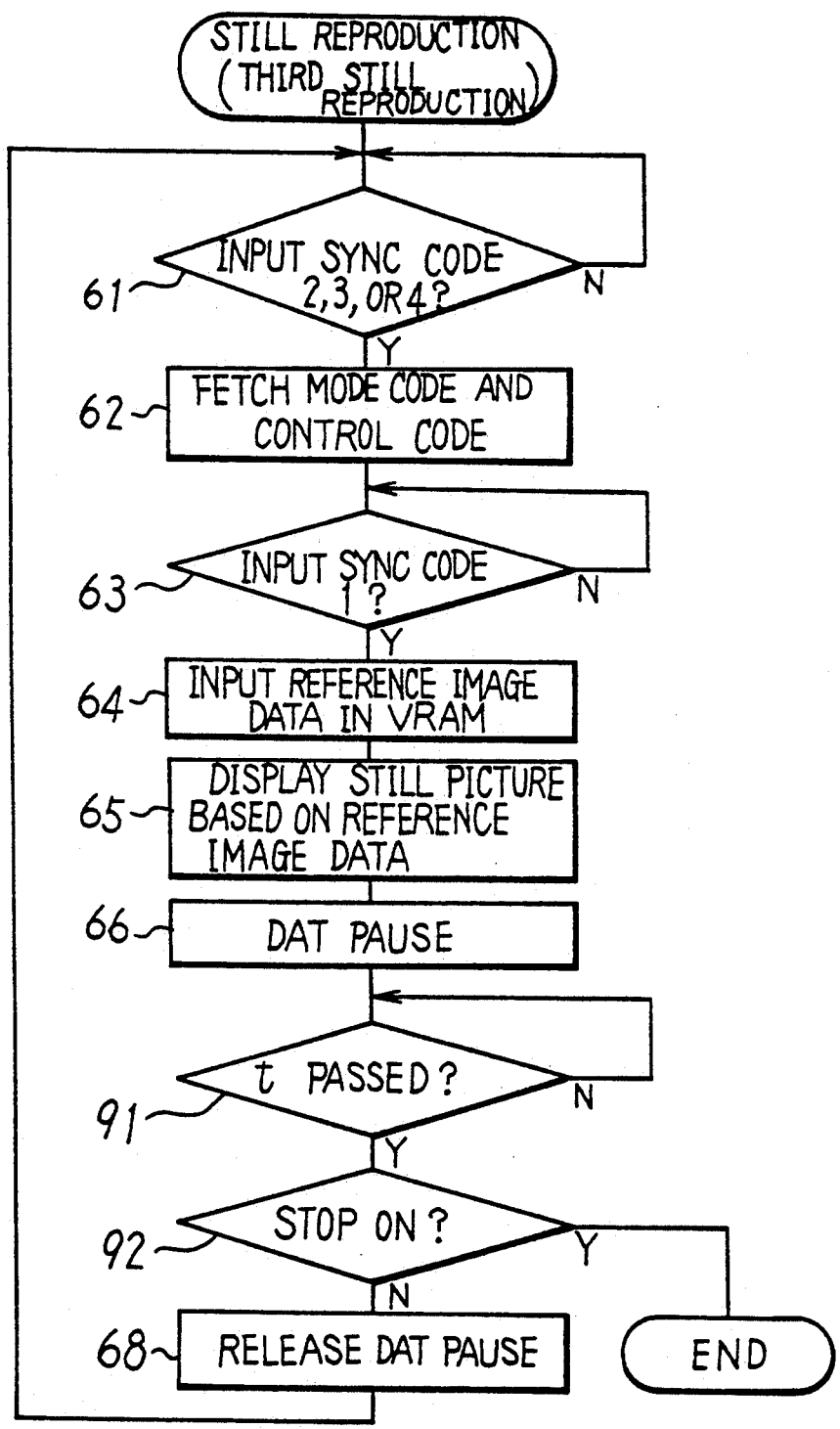

FIG. 13 is a flow chart illustrating the operation of the still reproduction (third still reproduction) for automatically displaying still pictures based on the reference image data at predetermined time intervals one after another. Those steps corresponding to what are shown in FIG. 11 are given the same numerals.

Referring to this diagram, after the DAT 130 is set to the play pause state in step 66, it is discriminated in step 91 whether or not a time t has elapsed.

When the time t has elapsed, it is discriminated in step 92 whether or not the stop key on the keyboard 140 is set on. When the stop key is not on, the play pause state of the DAT 130 is released in step 68, then the flow returns to step 61.

When it is judged in step 92 that the stop key is set on, the third still reproduction is terminated.

The other portion is the same as is exemplified in FIG. 11.

In the third still reproduction, still pictures based on reference image data in each compression reference period are automatically displayed one after another on the monitor at the time interval determined by the time t.

Figure 14:
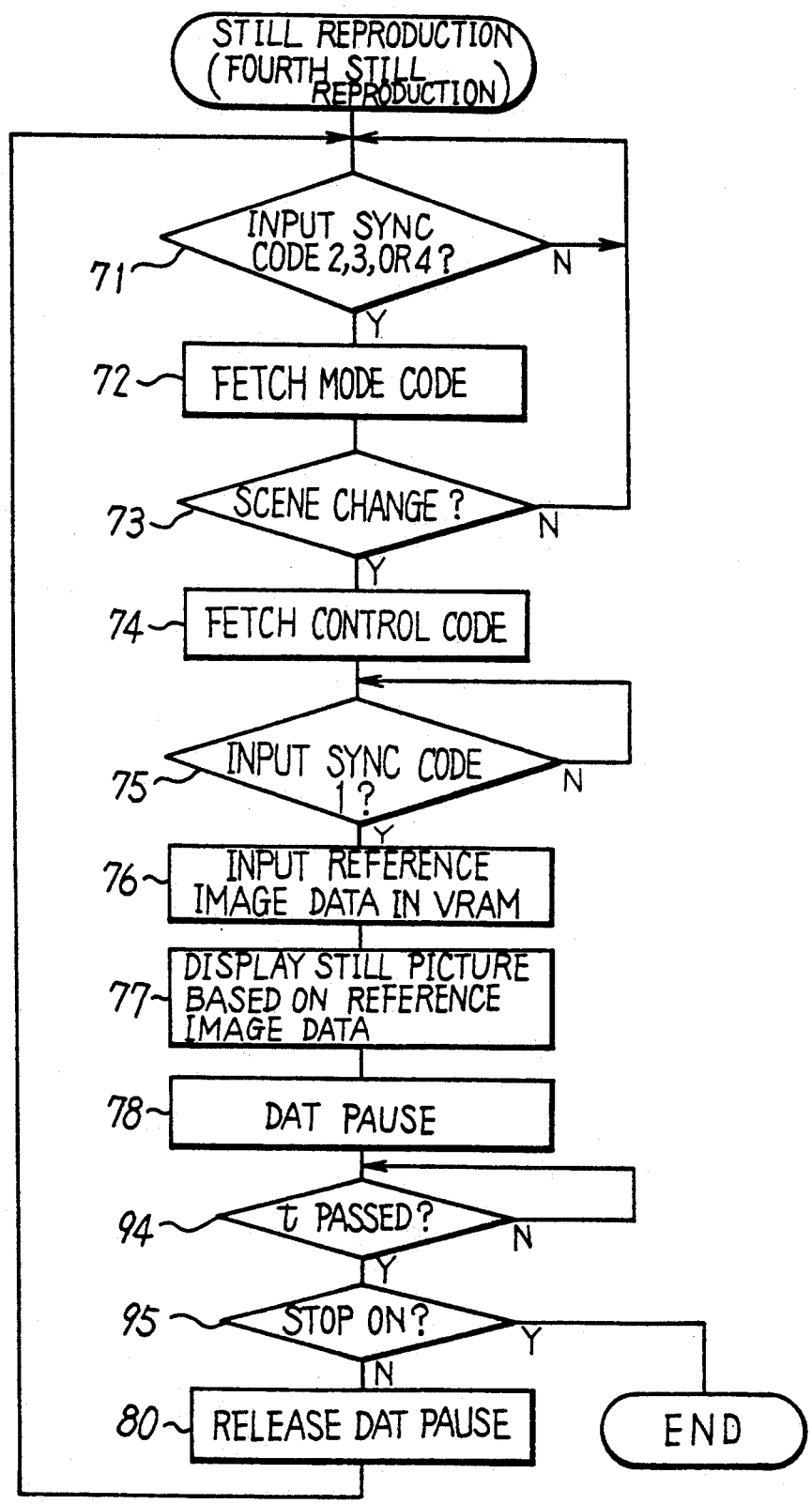

FIG. 14 is a flow chart illustrating the operation of the still reproduction (fourth still reproduction) for automatically displaying still pictures based on the reference image data immediately after a scene change one after another. Those steps corresponding to what are shown in FIG. 12 are given the same numerals.

Referring to this diagram, after the DAT 130 is set to the play pause state in step 78, it is discriminated in step 94 whether or not the time t has elapsed.

When the time t has elapsed, it is discriminated in step 95 whether or not the stop key on the keyboard 140 is set on. When the stop key is not on, the play pause state of the DAT 130 is released in step 80, then the flow returns to step 71.

When it is judged in step 95 that the stop key is set on, the fourth still reproduction is terminated.

The other portion is the same as is exemplified in FIG. 12.

In the fourth still reproduction, the next scene change is detected after the time t has elapsed, and still pictures based on reference image data immediately after the scene change are automatically displayed one after another on the monitor.

In the normal reproduction mode as illustrated by the flow chart in FIG. 10, for example, if the pause key on the keyboard 140 is set on to set the play pause mode, it is possible to make a design modification so that a still picture based on a one-frame image formed immediately before that point by the image expander 46 is displayed on the monitor, thus permitting a still picture of an arbitrary frame to be monitored.

The strobe reproduction will now be discussed. The tape running speed for reproduction in strobe reproduction mode is the same as the speed in normal reproduction mode.

Figure 15:
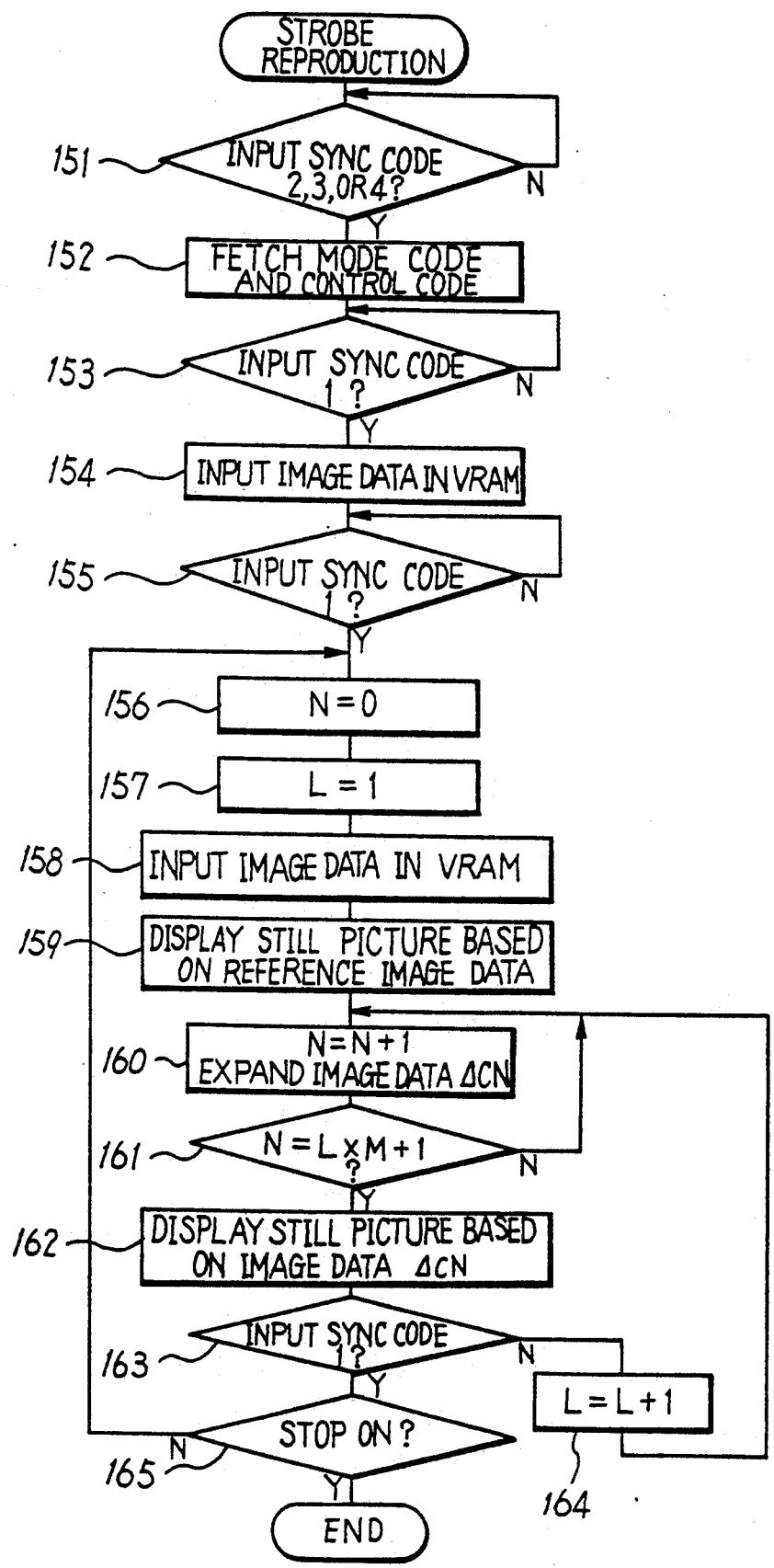

FIG. 15 is a flow chart illustrating the operation of the strobe reproduction.

Referring to this diagram, when the strobe reproduction is selected through the operation of the keyboard 140, it is discriminated in step 151 whether or not the sync code 2, 3 or 4 has been input.

When any of the sync codes has been input, a mode code and a control code following the sync code are fetched in the control area, and the image expander 46 and the like are set to perform an operation associated with compressed image data to be reproduced in step 152.

In the subsequent step 153, it is discriminated whether or not the sync code 1 has been input. When the sync code 1 has been input, inputting compressed image data for one compression reference period into any video RAM (video RAMs $22a-22c$ being sequentially used) starts in step 154.

In the next step 155, it is discriminated whether or not the sync code 1 has been input. When the sync code 1 has been input, $N=0$ is set, followed by setting of $L=1$ in step 157. In the next step 158, inputting compressed image data for one compression reference period in the next video RAM starts.

In the subsequent step 159, the compressed image data written in the video RAM in the previous compression reference period is sequentially read out, then expanding the read data is executed in the image expander 46. A still picture is then displayed on the monitor (not shown) connected to the terminals 49R, 49G and 49B.

Then, $N=N+1$ and the difference compressed image data $\Delta cN$ is read out from the video RAM and subjected to an expanding process in step 160.

In the next step 161, it is discriminated whether or not N equals $L \times M + 1$ where M is the number of frames skipped in strobe display and is preset by the keyboard 140.

When N does not equal $L \times M + 1$ in step 161, the flow returns to step 160, and the same processing as described above will be executed. When these values are equal to each other, however, a still picture based on the difference compressed image data $\Delta cN$ is displayed on the monitor.

Then, it is discriminated in step 163 whether or not the sync code 1 has been input. When the sync code 1 has not been input, $L=L+1$ in step 164, then the flow returns to step 160 to perform the same processing as described above.

When the sync code 1 has been input in step 163, it is discriminated whether or not the stop key on the keyboard 140 is set on in step 165.

When the stop key is not set on, the flow returns to step 156 and the above-described operation will be repeated. When the stop key is set on, on the other hand, the strobe reproduction is terminated.

In the strobe reproduction, still pictures based on image data for every M-th frame is sequentially displayed on the monitor in each compression reference period, thus presenting a so-called strobe display.

The fast-forward reproduction will now be described.

Figure 16:
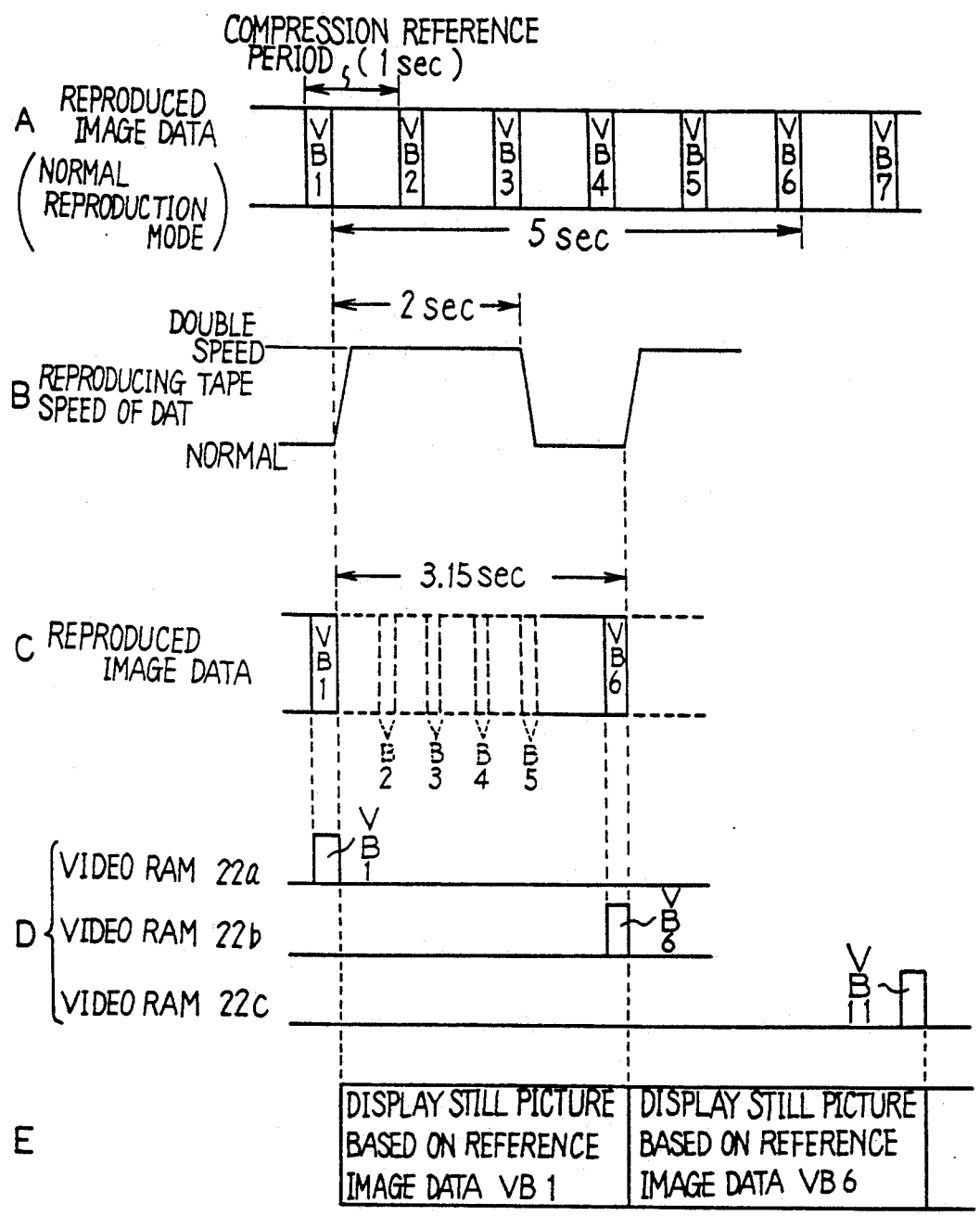
FIG. 16 is a time chart for explaining the operation of fast-forward reproduction.

A in FIG. 16 shows reproduced image data in normal reproduction mode, $VB_1$, $VB_2$, . . . representing reference image data in the respective compression reference periods which are reproduced at intervals of one second in normal reproduction mode.

In this embodiment, when one reference image data, for example, $VB_1$ is reproduced, the tape reproducing speed of the DAT 130 is increased to be double the normal speed and the tape is run at this speed for two seconds. Then, the tape reproducing speed is set back to the normal speed, before the next reference image data is reproduced (see B in FIG. 16).

The same operation will be repeated thereafter.

The tape reproducing speed is set back to the normal speed before reproduction of the reference image data because the rotary head should be made to properly perform the scanning without crossing the recording tracks.

In the above-described reproduction, reference image data $VB_1$, $VB_6$, $VB_{11}$, . . . are reproduced at intervals of 3.15 seconds as indicated by C in FIG. 16. Those portions (between $VB_1$ and $VB_6$) indicated by the broken lines are where the rotary head has scanned crossing the recording tracks, and no accurate image data can be obtained.

The reference image data $VB_1$, $VB_6$, $VB_{11}$, . . . reproduced in the above manner are sequentially written in the video RAMs 22a-22c as indicated by D in FIG. 16.

The reference image data written in the video RAMs 22a-22c are read out and supplied to the image expander 46 where the data are expanded to form image data for one frame. A still picture based on this one-frame image data is kept displayed until image data for one frame is formed based on the next reference image data to be reproduced (see E in FIG. 16).

What is displayed at intervals of five seconds in normal reproduction mode (e.g., images originated from the reference image data $VB_1$ and $VB_6$) will be displayed at intervals of 3.15 seconds by the above-described reproducing operation. Accordingly, the fast-forward reproduction of about $5/3.15 \approx 1.6$ can be realized.

Figure 17:
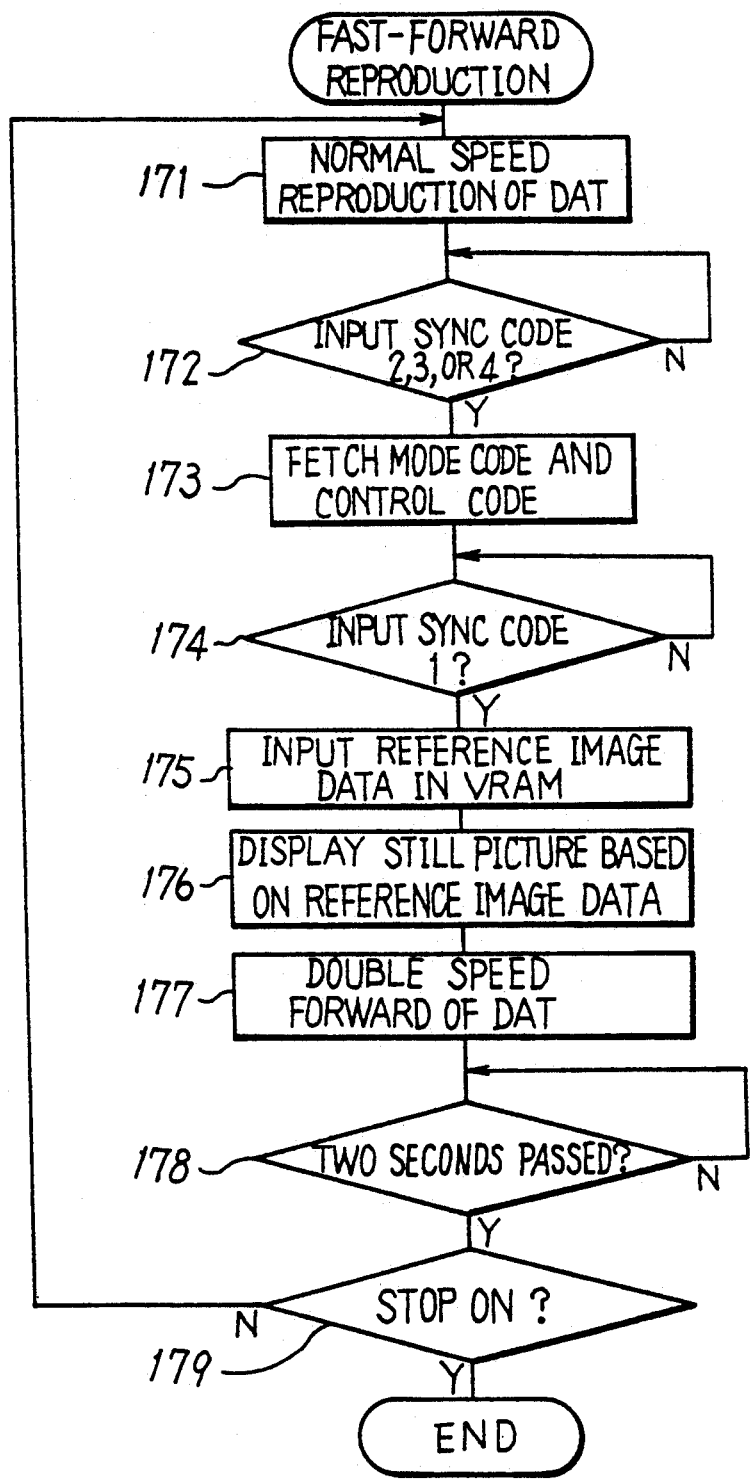
FIG. 17 is a flow chart illustrating the operation of fast-forward reproduction.

FIG. 17 is a flow chart illustrating the operation of this fast-forward reproduction.

Referring to this diagram, when the fast-forward reproduction is selected through the operation of the keyboard 140, the DAT 130 is controlled by the controller 110 to enter a reproduction mode at the normal speed in step 171.

In the next step 172, it is discriminated whether or not the sync code 2, 3 or 4 has been input.

When any of the sync codes has been input, a mode code and a control code following the sync code are fetched in the control area, and the image expander 46 and the like are set to perform an operation associated with compressed image data to be reproduced in step 173.

It is discriminated in the next step 174 whether or not the sync code 1 has been input. When the sync code 1 has been input, reference image data is written in any video RAM (video RAMs 22a-22c being sequentially used) and such writing starts in step 175.

In the subsequent step 176, the reference image data is read out from the video RAM, then is expanded by the image expander 46 to form image data for one frame, and this one-frame image data is stored in a memory. The one-frame image data is repeatedly read out from this memory, whereby still pictures based on the reference image data are displayed on the monitor connected to the terminals 49R-49B.

Then, the DAT 130 is controlled by the controller 110 to double the tape running speed in step 177.

It is discriminated in step 178 whether or not two seconds have elapsed. When two seconds have passed, then it is discriminated in step 179 whether or not the stop key on the keyboard 140 is set on. When the stop key is not on, the flow returns to step 171 and the same operation as described above will be repeated. When the stop key is judged to be on, however, the fast-forward reproduction is terminated.

In the above description, it is mentioned that the fast-forward reproduction about 1.6 times faster than the normal one is realized. The fast-forward reproduction at any speed can be realized by adjusting the tape reproducing speed and tape running time.

The slow reproduction will be described below.

Figure 18:
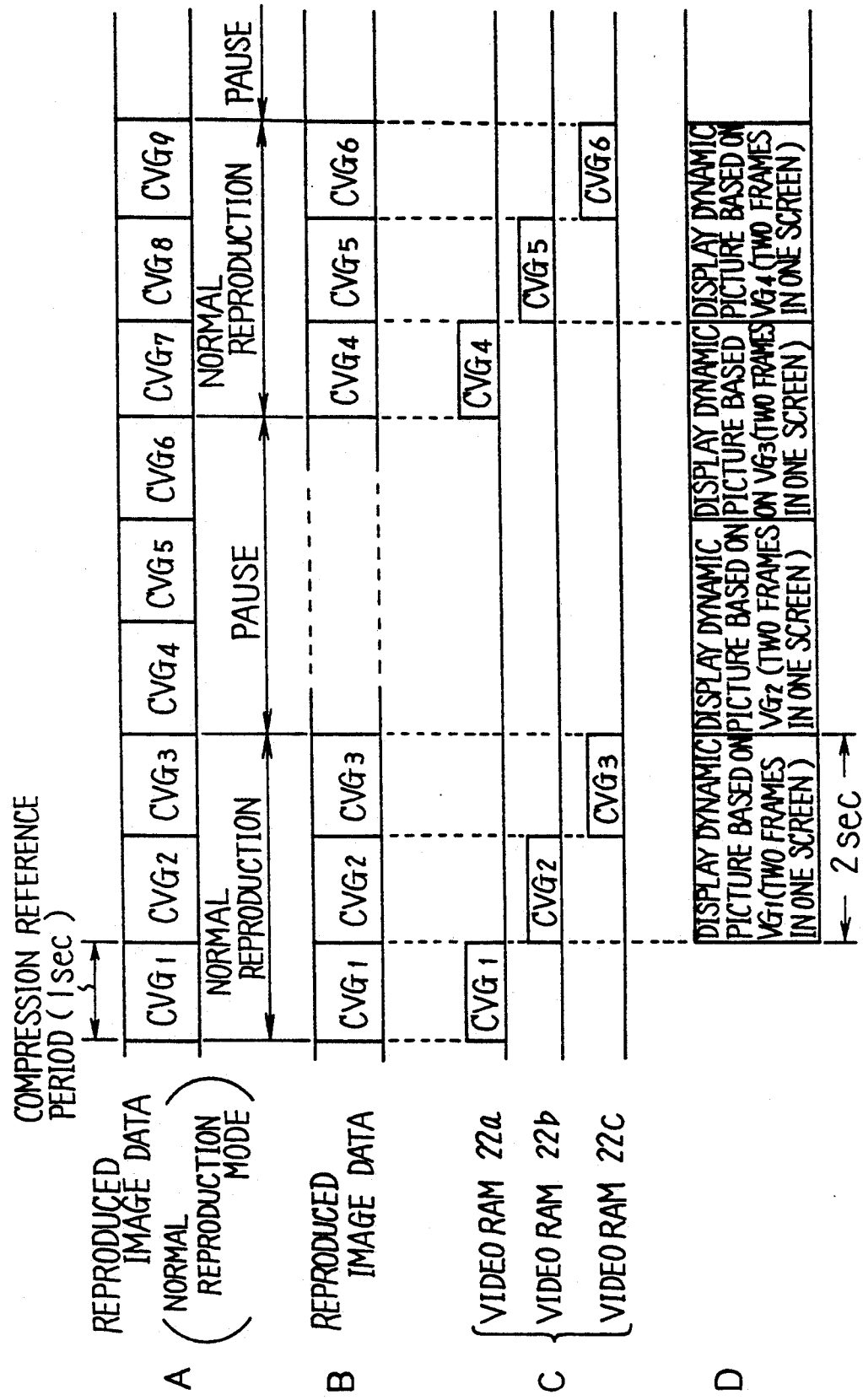
FIG. 18 is a time chart for explaining the operation of slow reproduction.

A in FIG. 18 shows reproduced image data in normal reproduction mode, $CVG_1$, $CVG_2$, . . . representing compressed image data (reference image data $VB_N$ and difference compressed image data $\Delta c1-\Delta c29$) in the respective compression reference periods which are sequentially reproduced every one second in normal reproduction mode.

In this embodiment, the DAT 130 is set to the normal speed reproduction state during three compression reference periods, then is set to the play pause state for the same periods. Thereafter, this setting will be repeated.

Through the operation of the DAT 130, compressed image data ($CVG_1-CVG_3$) in three compression reference periods are continuously reproduced, then compressed image data ($CVG_4-CVG_6$) in the subsequent three compression reference periods are continuously reproduced, as indicated by B in FIG. 18. Thereafter, the reproduction will be repeated.

The compressed image data $CVG_1$, $CVG_2$, . . . in the individual compression reference periods reproduced in the above manner are sequentially written in the video RAMs 22a-22c as indicated by C in FIG. 18.

The compressed image data written in the video RAMs 22a-22c are read out and supplied to the image expander 46 for data expansion. In this case, image data $VG_1$, $VG_2$, . . . for 30 frames are formed from the compressed image data $CVG_1$, $CVG_2$, . . . as in normal reproduction mode.

A dynamic picture based on image data $VG_1$, $VG_2$, . . . is displayed on the monitor in such a manner that the same screen is kept displayed every two frames. That is, the time axis of the dynamic picture based on the image data $VG_1$, $VG_2$, . . . is elongated to twice as longer and is displayed accordingly (see D in FIG. 18).

Since the time axis of a dynamic picture to be displayed on the monitor is doubled, a slow image at a half the normal speed is displayed on the monitor.

Figure 19:
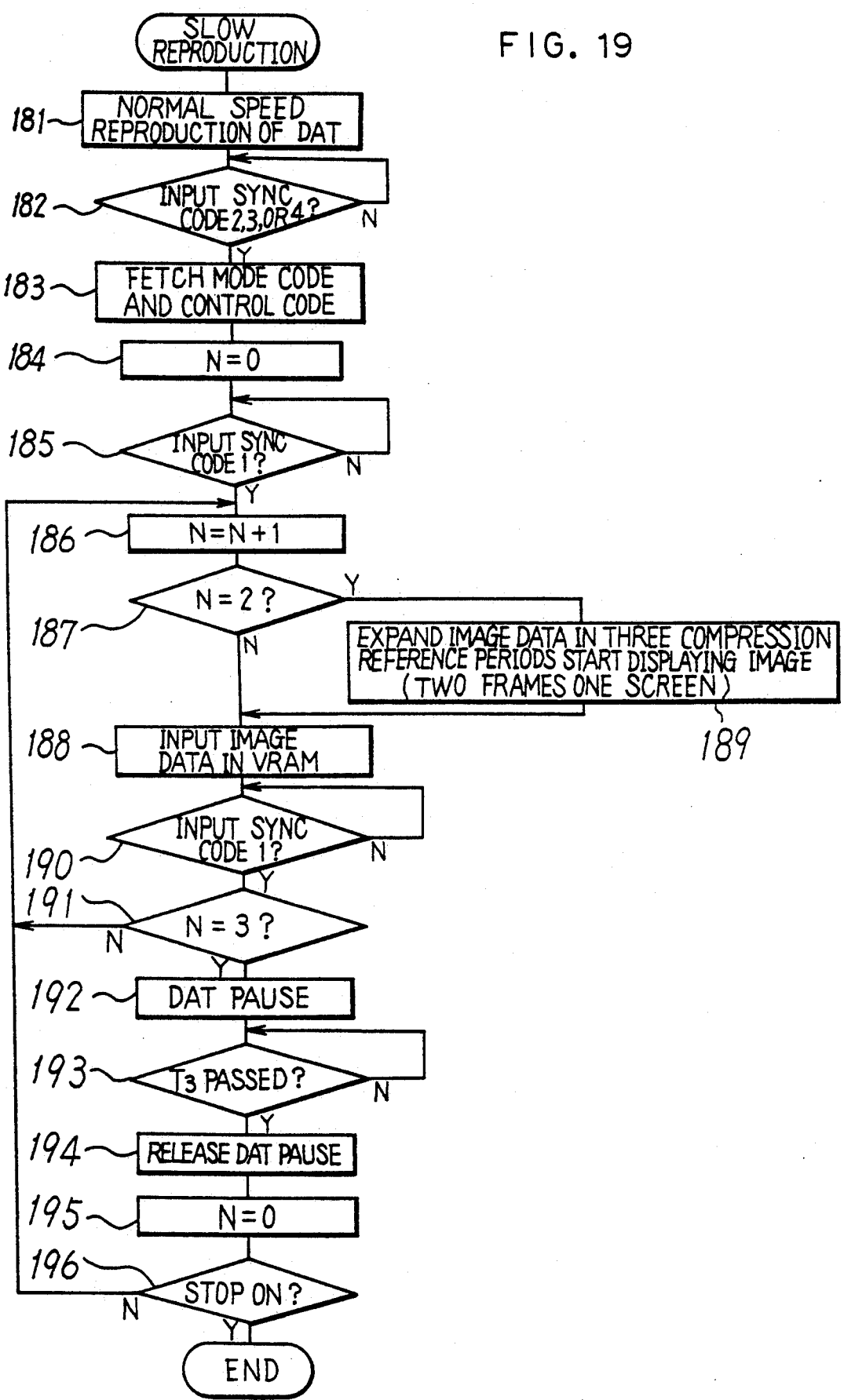
FIG. 19 is a flow chart showing the operation of slow reproduction.

FIG. 19 is a flow chart illustrating the operation of this slow reproduction.

Referring to this diagram, when the slow reproduction is selected through the operation of the keyboard 140, the DAT 130 is controlled by the controller 110 to enter a reproduction mode at the normal speed in step 181.

In the next step 182, it is discriminated whether or not the sync code 2, 3 or 4 has been input.

When any of the sync codes has been input, a mode code and a control code following the sync code are fetched in the control area, and the image expander 46 and the like are set to perform an operation associated with compressed image data to be reproduced in step 183.

After N=0 is set in the next step 184, it is discriminated whether or not the sync code 1 has been input in step 185.

When the sync code 1 has been input, N=N+1 in step 186, then it is discriminated whether or not N=2 in step 187. If N is not equal to 2, the flow directly advances to step 188. If N=2, the flow advances through step 189 to step 188.

In step 189, reading out the compressed image data for three compression reference periods which are to be sequentially written in the video RAMs 22a-22c starts, the expanding process starts in the image expander 46, and a dynamic picture is displayed on the monitor (not shown) connected to the terminals 49R-49B. In this case, the same screen is kept displayed every two frames.

In step 188, inputting compressed image data for one compression reference period in any video RAM (video RAMs 22a-22c being used in order) starts.

In the next step 190, it is discriminated whether or not the sync code has been input. If the sync code 1 has been input, it is discriminated whether or not N=3 in step 191. When N does not equal 3, the flow returns to step 186, and the same operation as described above will be repeated.

When N=3, the DAT 130 is controlled by the controller 110 to enter the play pause mode in step 192. At this point of time, image data for three consecutive compression reference periods have been written in the video RAMs 22a-22c.

It is judged in the next step 193 whether or not a time T3 equal to the three compression reference periods has elapsed. The time is not set to three seconds because the three compression reference periods may become shorter than three seconds when there is a scene change.

The play pause state of the DAT 130 is released under the control of the controller 110 in step 194, then N=0 is set in step 195. It is then determined in step 196 whether or not the stop key on the keyboard 140 is set on.

When the stop key is not set on, the flow returns to step 186 and the above-described operation will be repeated. When the stop key is set on, on the other hand, the slow reproduction will be terminated.

The foregoing description has been given with reference to the case where the normal-speed reproduction mode for three compression reference periods, and the play pause mode for the same periods are repeated. The "three" compression reference periods are determined in association with the three video RAMs 22a-22c, and this number is in no way restrictive. For instance, one compression reference period as well as two compression reference periods may be employed.

Although the slow reproduction at a half the normal speed has been explained in the foregoing description, the slow reproduction at an arbitrary speed can be realized by adjusting the pause duration. For instance, if the pause duration is set to twice as longer than the compression reference period in the case of the normal-speed reproduction and the same screen is kept displayed every three frames, the time axis of a dynamic picture displayed on the monitor becomes three times longer, thereby realizing a slow reproduction at a ⅓ of the normal speed.

The reverse reproduction will now be discussed.

Figure 20:
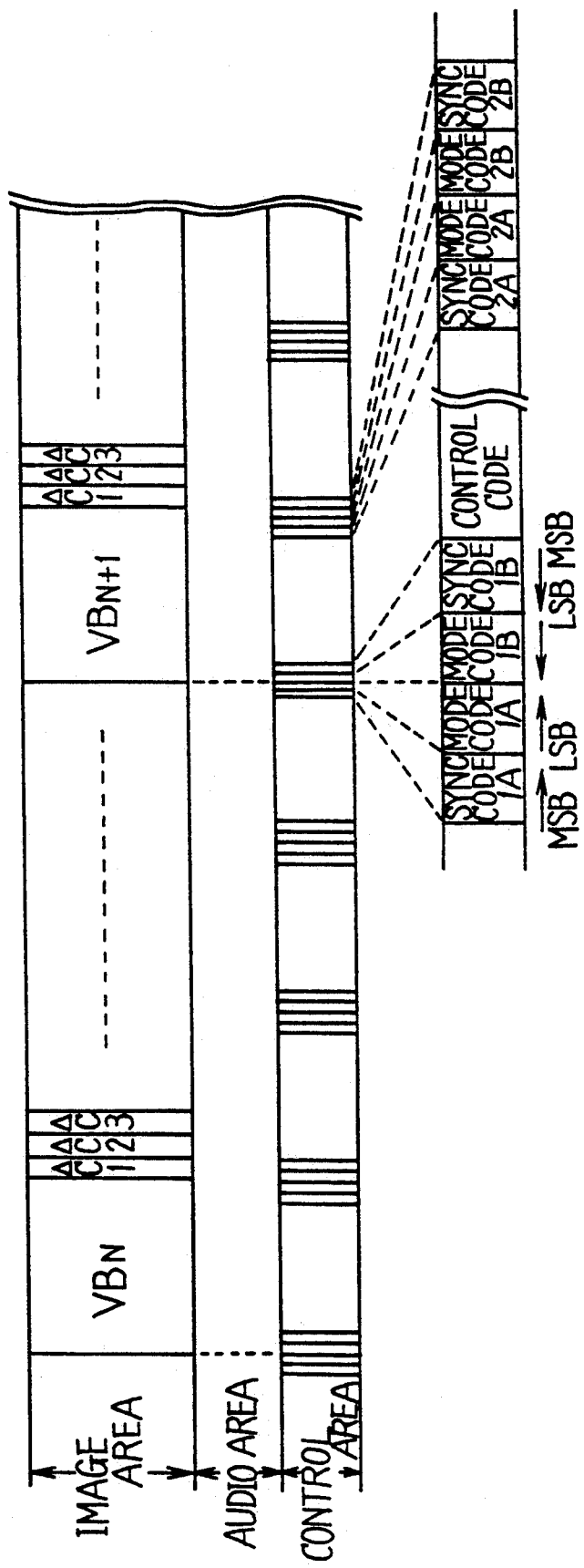
FIG. 20 is a diagram illustrating the structure of record data for realizing reverse reproduction.

To realize the reverse reproduction, record data is structured as shown in FIG. 20. The data structure in the control area is altered as compared with the one shown in FIG. 4.

Four sync codes 1A-4A and four mode codes 1A-4A are allocated in each compression reference period. These codes are the same as those shown in FIG. 4.

Referring to FIG. 20, further sync codes 1B-4B and mode codes 1B-4B are allocated at locations (the area for the control code in FIG. 4) symmetrical to the sync codes 1A-4A and mode codes 1A-4A.

The sync codes 1A-4A and mode codes 1A-4A can be detected at the time of normal reproduction, while the sync codes 1B-4B and mode codes 1B-4B can be detected at the time of reverse reproduction.

In the mode codes 1A-4A are allocated data corresponding to the next compression reference period in the normal reproducing direction as in the case of the mode code in FIG. 4.

In the mode codes 1B-4B are allocated data corresponding to the next compression reference period in the reverse reproducing direction. The data includes data about a change in the amount of the difference compressed image data $\Delta c1-\Delta c29$ in the next compression period, data indicating if the period is immediately before the occurrence of a scene change, and data about the period in the last case, in addition to the same data allocated in the mode codes 1A-4A.

In the above example, the amount of difference compressed image data $\Delta c1-\Delta c29$ is fixed and the allocated position of each difference compressed image data is therefore fixed. However, the amount of difference compressed image data $\Delta c1-\Delta c29$ may be changed to improve the quality of image data in accordance with the status of an image. (This case will be described later.) In this case, the allocated position of each difference compressed image data varies. It is therefore necessary to consider the amount of the individual difference compressed image data $\Delta c1-\Delta c29$ in order to control the addresses of the video RAMs 22a-22c to write reproduced data at the same addresses as used in normal reproduction mode from the reverse direction in reverse reproduction mode.

This is the reason why data about a change in the amount of difference compressed image data $\Delta c1-\Delta c29$ is allocated in the mode codes. The change in the amount of data will be discussed later.

The record data is structured as shown in FIG. 20 so that reproduction is effected, using the sync codes 1A-4A and mode codes 1A-4A in normal reproduction mode.

In reverse reproduction mode, the reproduction operation is executed using the sync codes 1B-4B and mode codes 1B-4B. Based on data which indicates a change in the amount of difference compressed image data allocated in the mode codes 1B-4B, addresses of the video RAMs 22a-22c are controlled, and reproduced data is written, from the reverse direction, at the same address as is done in normal reproduction mode.

Accordingly, the subsequent expansion process by the image expander 46 is also carried out in the same manner as in normal reproduction mode, and a reverse reproduced screen is displayed on the monitor.

With the structure of the record data shown in FIG. 20, still reproduction from the reversed direction, fast-forward reproduction, and slow reproduction are also executed in the same manner.

A change in the amount of the difference compressed image data $\Delta c1-\Delta c29$ will now be described.

FIG. 21 illustrates an example for changing the amount of data.

The area for the reference image data has 276480 bits as in the case where the amount of the above data is fixed.

31 areas B1-B31, 27200 bits each, are provided as the areas of the difference compressed image data $\Delta c1-\Delta c29$. The total areas are 843200 bits.

$$27200 \times 31 = 843200 \text{ bits}$$

The image area of a single compression reference period is 1152000 bits as described before, and the remaining 32320 bits are used to adjust the fixed length.

The reference image data is allocated in the area for the reference image data in the same manner as done in the case where the amount of the above data is fixed.

The difference compressed image data $\Delta c1-\Delta c29$ are basically allocated in the areas B1-B29, respectively. When the image in slow action is drastically changed to the one in rapid action, the number of bits showing differential data become large and the total amount of data is increased and it is conceived that the difference compressed image data cannot be held in the area of 27200 bits. In this case, two or more areas are used.

When the two or more areas are used for holding one piece of the difference compressed image data, this is informed and recorded, for example, at the head of the control code as shown in FIG. 21.

Allocated in a block number portion are data 1-29 which indicate the difference compressed image data using two or more areas. Data representing the number of the areas to be used is allocated in a quantity portion (for example, "0" for two areas, and "1" for three areas).

When the difference compressed image data $\Delta c5$, and $\Delta c20$ require two areas, for example, data "5" is allocated in the first block number portion, "0" in the first quantity portion, "20" in the next block number portion, and "0" in the next quantity portion.

Then, the image data $\Delta c1-\Delta c4$ are allocated in the areas B1-B4 respectively, the image data $\Delta c5$ in the areas B5 and B6, the image data $\Delta c6-\Delta c19$ in the respective areas B7-B20, the image data $\Delta c20$ in the areas B21 and B22, and the image data $\Delta c21-\Delta c29$ in the respective areas B23-B31.

The above data is sent to the controller 110 in the reproduction mode, and the addresses of the individual video RAMs 22a-22c are controlled, so that the correct signal reproducing process will be performed the same as when the amount of every difference compressed image data is fixed.

FIG. 22 illustrates another example for changing the data amount.

276480 bits are given as the area for the reference image data, the same as a case of the data with the fixed amount.

The areas for the difference compressed image data $\Delta c1-\Delta c29$ are respectively provided with bits according to the amount of their data.

In association with the individual difference compressed image data $\Delta c1-\Delta c29$ allocated in the image area, the address information of the video RAMs 22a-22c to be written in the normal reproduction is allocated, for example, as 18-bit data, in the control area.

This address information is read by the controller 110 in the normal reproduction mode, to control the addresses of the video RAMs 22a-22c, and the correct signal reproducing system is performed in the same manner as the case of the amount of every difference compressed image data described above is fixed.

By changing the data amount as shown in FIGS. 21 and 22, the difference compressed image data whose amount corresponds to the image condition can be recorded and reproduced, improving the quality of the image data.

The example shown in FIG. 22 is superior to the one shown in FIG. 21 in terms of effective use of the image area, while the example in FIG. 21 is superior in terms of effective use of the control area.

A time code will now be explained.

Though not described above, the time code may be allocated in the control area of the record data.

The sync code portion consists of 64 bits in the above example. In this example, however, the sync code portion is given 48 bits with a 16-bit time code portion provided between the sync code portion and mode code portion, as shown in, for example, FIG. 23.

Like the sync code portions and mode code portions, for example, four time code portions may be provided in a single compression reference period (one second). The same data is allocated in the four time code portions.

16-bit data of the time code portion shows, for example, the absolute time (second). In the case of so-called BCD (Binary Coded Decimal) data, which represents every digit in decimal notation by 4-bit binary number, it is possible to represent the time from 0 to 9999 seconds. If the data is 16-bit binary data, the time from 0 to $(2^{16}-1)$ seconds can be expressed.

In normal reproduction mode, the time codes recorded in this way are fetched to be used for searching, display of the amount of remaining tape, and control for positional adjustment in editing mode.

Using the above time codes ensures a search with one-second precision; however, the use of the different types of sync codes 1-4 a search of $\frac{1}{4}$-second precision can be obtained.

Further, when the data indicating the change of the difference compressed image data allocated in the individual control areas are used, it is possible to search for the accuracy of the frame. This is effective for screen adjustment in editing mode, for example.

Figure 23:
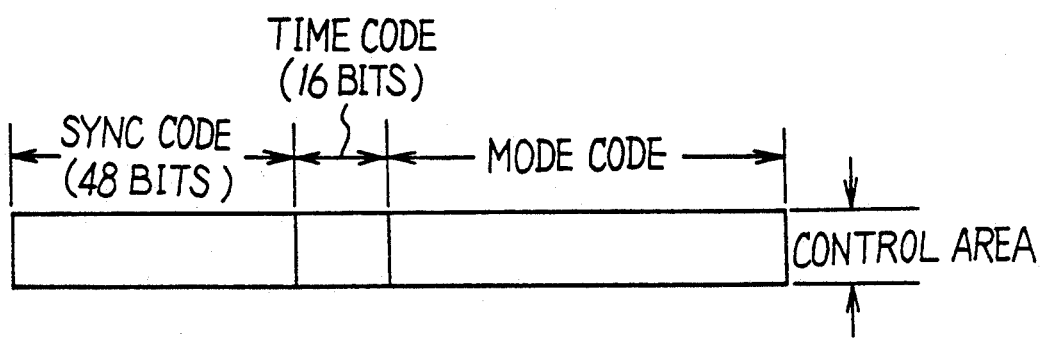
FIG. 23 is a diagram illustrating an example of a time code being inserted.

The structure of the time code, its allocated position, and the number of bits of the time code are not limited to those exemplified in FIG. 23. For example, "hour, minute, second" can be represented as the structure of the time code.

The description will now be given of the example of using two DATs and digital-dubbing the tape on which the signal processor shown in FIG. 1 has recorded the signal with the data structure shown in FIG. 4 or 20 by the DAT.

Figure 24:
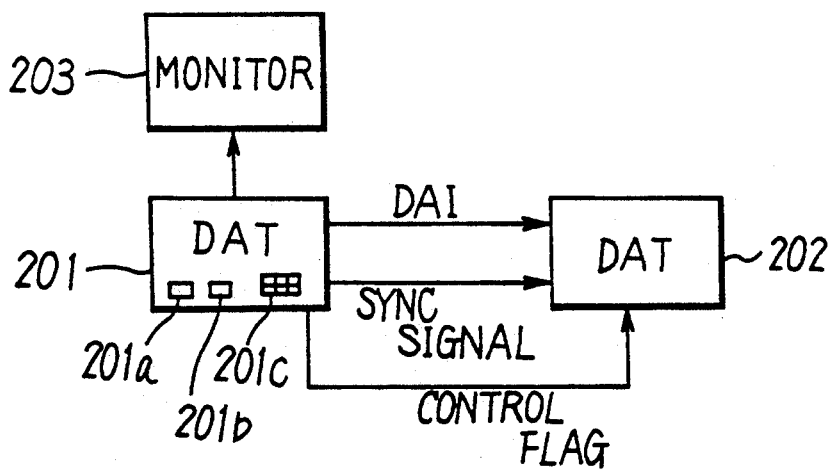
FIG. 24 is a block diagram illustrating the structure for executing digital dubbing.

FIG. 24 illustrates the structure for digital-dubbing with the two DATs.

Reference numeral "201" denotes the DAT on the master side and "202 the DAT on the slave side. These DATs 201 and 202 are connected to each other through a digital audio interface DAI. The DAT 201 supplies a sync signal such as a bit clock BCK to the DAT 202 for synchronization therebetween. The DAT 201 also sends various control flags to the DAT 202 to control the DAT 202.

The DAT 201 includes at least a video reproduction circuit of the signal processor shown in FIGS. 1A and 1B, and the video-out terminal is connected to a monitor 203.

The DAT 201 has a dubbing start key 201a, a dubbing stop key 201b, and dubbing-time set key 201c, besides the normal record and play keys (not shown).

A description will now be given of the case where dubbing in an arbitrary period is executed while a reproduced screen is being monitored, referring to the flow chart in FIG. 25. In this case, it is necessary to allocate and record the sync codes 1B-4B for reverse reproduction, in addition to the sync codes 1A-4A as shown in FIG. 20.

When the dubbing start key 201a is pressed for dubbing operation, with the DAT 201 in normal reproduction mode and a picture displayed in the monitor 203, the DAT 201 supplies the record pause flag to the DAT 202 in step 211 to set the DAT 202 in the record pause state.

In step 212, the frame image data at the time of the dubbing start key 201a set on is repeatedly read from the memory of the image expander 46 one after another, to display a still picture on the monitor 203.

The DAT 201 starts the reverse reproduction in step 213. The still picture remains on the monitor even during the reverse reproduction.

Then, it is determined in step 214 if the sync code 1B has been input. When the sync code 1B has been input, it is determined in step 215 whether the sync code 4B is received. When the sync code 4B is received, it is determined in step 216 if the sync code 3B has been input.

When it is judged in step 216 that the sync code 3B has been received, the DAT 201 stops the reverse reproduction in step 217.

In step 218, the DAT 201 sends a pause release flag to the DAT 202 to set the DAT 202 in a record state.

The DAT 201 starts normal reproduction in step 219, and reproduced data is sent through the digital audio interface DAI to the DAT 202, thus starting recording. DAT 201 starts in step 220 displaying the dynamic picture on the monitor 203.

Then, it is determined in step 221 whether or not the dubbing stop key 201b is set on. When the key is set on, it is determined in step 22 if the sync code 1A has been input. When the sync code 1A has been received, it is determined in step 223 if the sync code 2A has been input.

When the sync code 2A has been input, the DAT 201 sends a record stop flag to the DAT 202 in step 224, so that the DAT 202 is set in a stop state, thus stopping recording.

The DAT 201 stops reproduction in step 225, terminating the dubbing operation.

Figure 25:
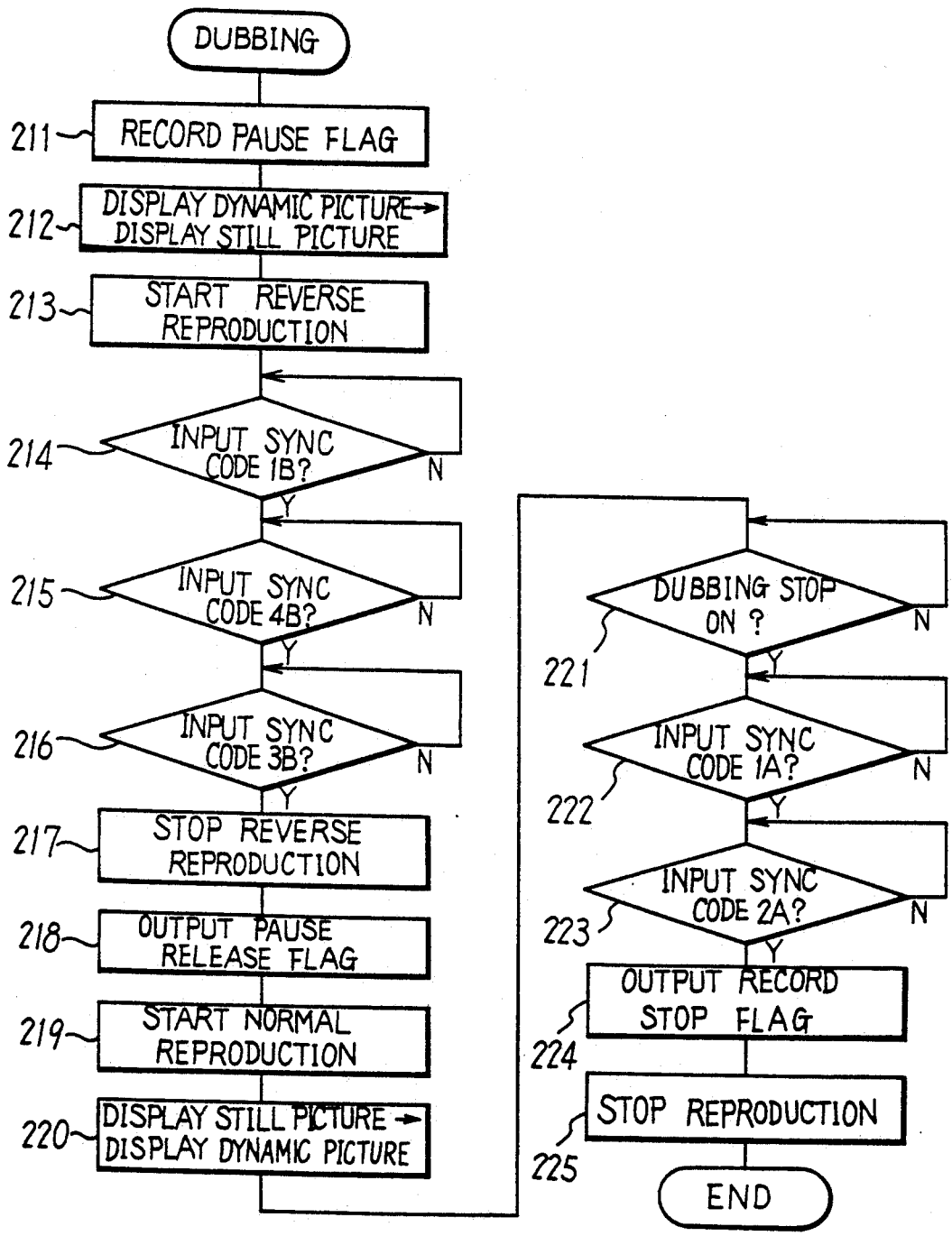
FIGS. 25 to 27 are flow charts showing the dubbing operation.

Referring to this dubbing in FIG. 25, since the still picture is displayed based on the frame image data when the dubbing start key 201a is set on, it is possible to confirm the image when the dubbing starts. Further, under the control based on the sync codes, recording starts from the portion immediately before the sync codes 4A and 4B and ends at the portion immediately after the sync codes 2A and 2B. This makes it possible to efficiently record only the necessary portion.

An example of dubbing for a certain period of time while monitoring the reproduced screen will now be explained referring to the flow chart in FIG. 26. This dubbing can be applied to both cases of recording data in the structures shown in FIGS. 4 and 20. The sync codes 1-4 in FIG. 26 correspond to the sync codes 1A-4A in FIG. 20.

When the dubbing start key 201a is set on to start dubbing while the DAT 201 is in normal reproduction mode and a dynamic picture is displayed on the monitor 203, the DAT 201 supplies a record pause flag to the DAT 202 in step 231 to set the DAT 202 in a record pause state.

Then, it is determined in step 232 whether or not the sync code 3 has been input. When the sync code 3 has been input, the DAT 201 sends a pause release flag to the DAT 202 in step 233 to set the DAT 202 in a record state. This starts recording the reproduced data which is sent from the DAT 201 through the digital audio interface DAI.

It is determined in step 234 if the dubbing stop key 201b is set on. When the dubbing stop key 201b is set on, it is determined in step 235 whether or not the sync code 1 has been received. When the sync code 1 is received, it is determined in step 236 whether the sync code 2 has been input.

When the sync code 2 has been received, the DAT 201 supplies the record stop flag to the DAT 202 in step 237, so that the DAT is stopped to stop recording.

The DAT 201 stops reproduction in step 238, terminating the dubbing operation.

Figure 26:
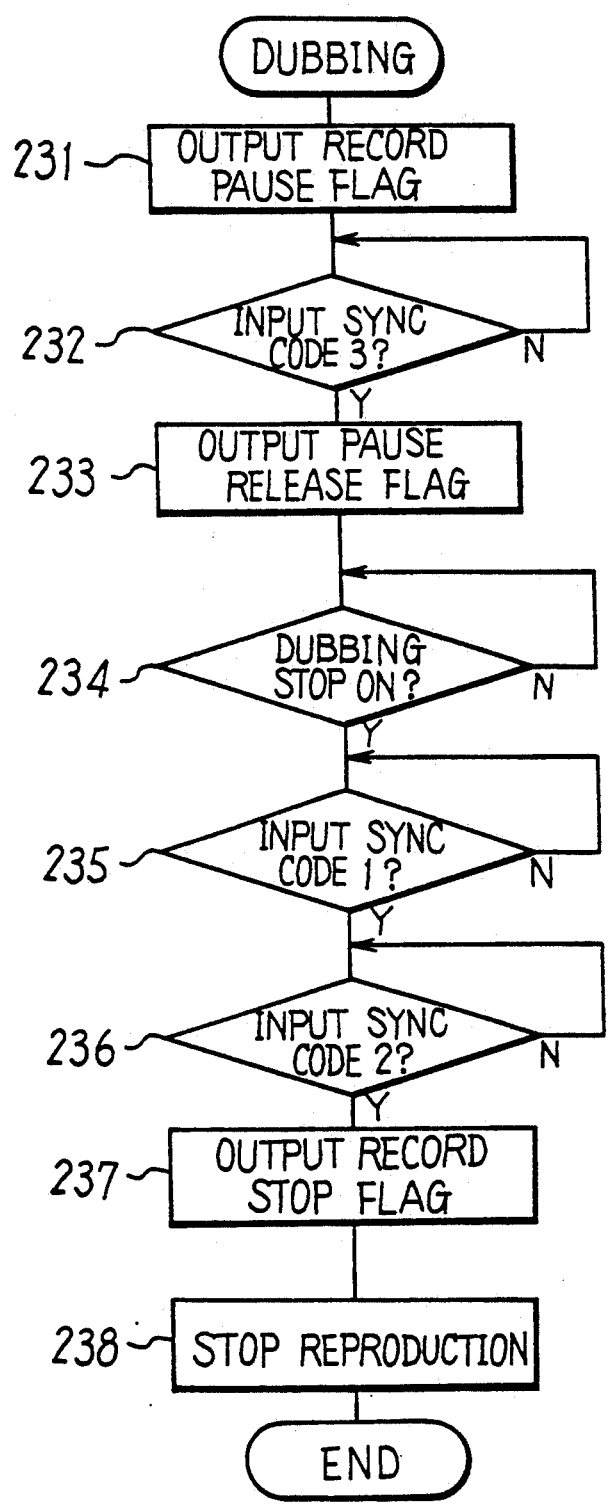

In the dubbing case in FIG. 26, the recording is also performed from the portion immediately before the sync code 4 up to the portion immediately after the sync code 2. Therefore, it is possible to efficiently record only the required portion.

An example of dubbing for a determined period of time will now be explained referring to the flow chart in FIG. 27. This dubbing can be applied to the case of recording the time codes shown in FIG. 23.

In step 241, a dubbing-period set key 201c is set on to set the dubbing start time and dubbing end time. The time is input in terms of "hour, minute, second."

When the dubbing start key 201a is set on in step 242, the DAT 201 supplies the record pause flag to the DAT 202 in step 243 to set the DAT 202 in a record pause state.

Then, the DAT 201 starts reproduction in step 244. It is determined in step 245 if the time code to be detected from the control area of the reproduced data indicates "dubbing start time −1 sec". When the time code is "dubbing start time −1 sec", it is determined in step 246 whether or not the sync code 3 has been input.

When the sync code 3 has been input in step 246, the DAT 201 sends a pause release flag to the DAT 202 in step 247 to set the DAT 202 in a record state. This starts recording the reproduced data which is sent from the DAT 201 through the digital audio interface DAI.

It is then determined in step 248 if the time code to be detected from the control area of the reproduced data indicates "dubbing end time +1 sec". When the time code is "dubbing end time +1 sec", the DAT 201 sends the record stop flag to the DAT 202 in step 249 so that the DAT 202 is set in a stop status to stop recording.

The DAT 201 stops the reproduction in step 250, terminating the dubbing operation.

Figure 27:
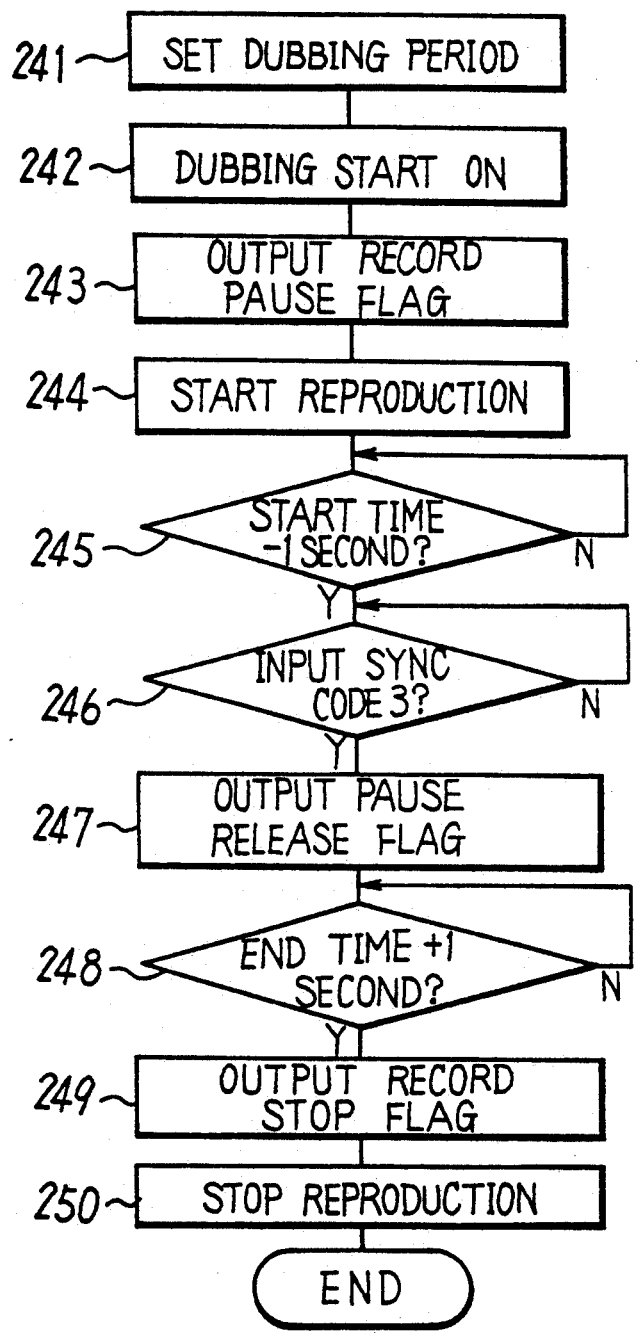

The dubbing example shown in FIG. 27 makes it possible to perform automatic dubbing in a set period of time. Under the control based on the sync codes, the recording is done from the portion immediately before the sync code 4 up to the portion immediately after the sync code 2. Therefore, it is possible to efficiently record only the required portion.

Although FIG. 24 illustrates the DAT 201 on the side of the master operating keys, the DAT 202 on the slave side can be also structured to have keys for operation.

The above described examples are for recording only the dynamic pictures as image data. The image data for the still pictures is also possibly recorded by switching.

Figure 28:
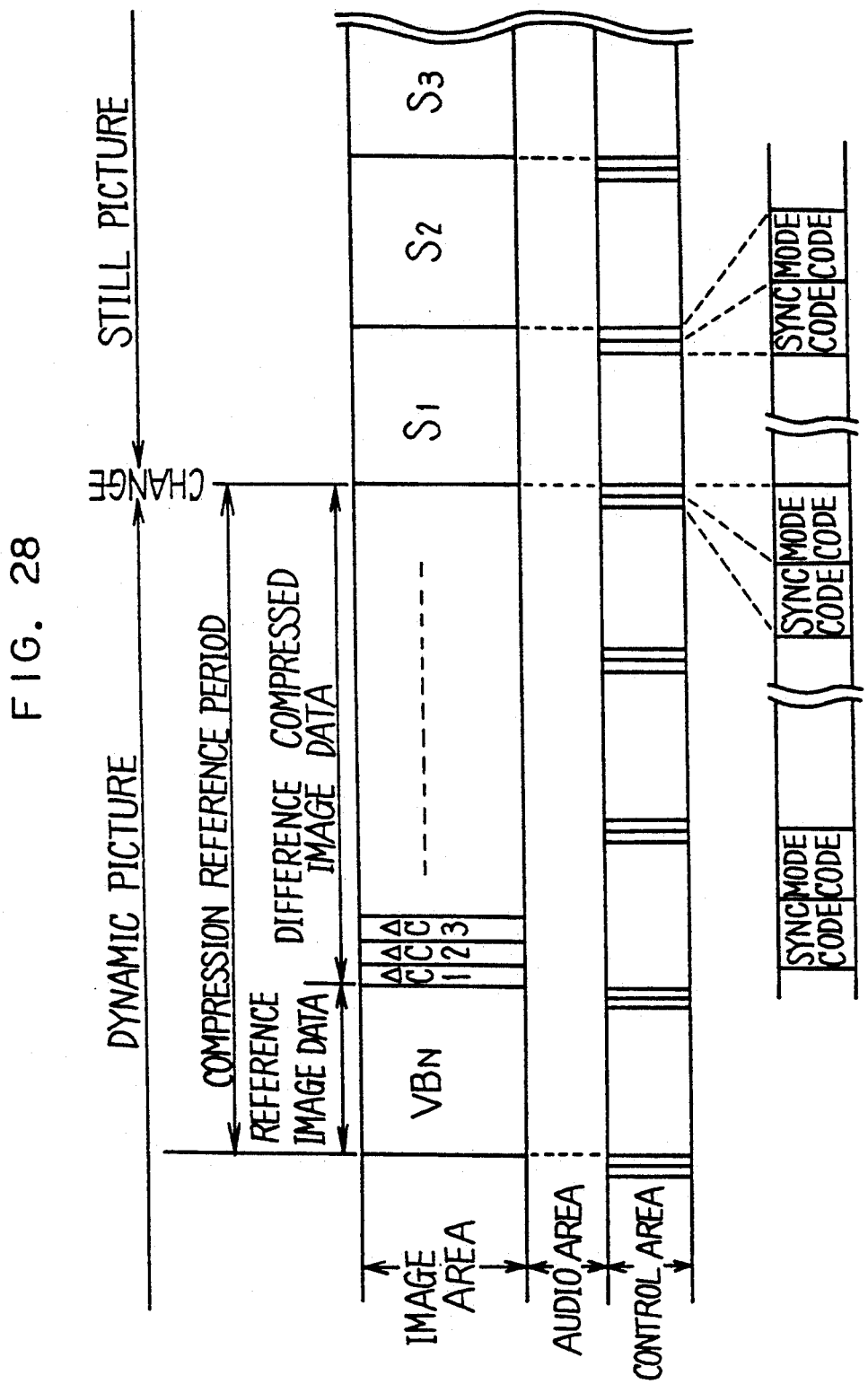
FIG. 28 is a diagram illustrating the structure of record data when a dynamic picture and a still picture are selectively recorded.

In this case, the image data $S_1, S_2, \ldots$ for still pictures are recorded after some difference compressed image data for dynamic pictures is allocated, as shown in FIG. 28.

Therefore, it is easy to realize the recording of the image data $S_1, S_2, \ldots$ for still pictures, using the signal processor in FIGS. 1A and 1B.

In other words, the image data of the individual frames, which the RAMs 17a-17c receive one after another, are read out and allocated as still picture data in the data area for recording.

In this case, the image data $S_1, S_2, \ldots$ for still pictures can be compressed by the image compressor 19 to be identical to the reference image data $VB_N$ for dynamic pictures. Further, the image data for still pictures can be recorded in high quality by enlarging the area for data recording with a low compression ratio or without compression.

Since the signal processor in FIGS. 1A and 1B include the RAMs 17a-17c for three frames, even if the image data for still pictures is made to have high quality, it is still possible to effect recording for three consecutive frames or so-called three continuous shots.

As shown in FIG. 28, the sync code portions and mode code portions are provided in the control area corresponding to the point immediately before the image data $S_1, S_2, \ldots$ for still pictures. The data indicating the still picture mode is allocated in each mode code portion.

In reproduction mode, control can be effected so as to shift from reproduction of dynamic pictures to reproduction of still pictures, based on the data which indicates the still picture mode and is detected from the control area of the reproduced data.

Although the image data $S_1, S_2, \ldots$ for still pictures are consecutively arranged in FIG. 28, these data may be also arranged at predetermined intervals.

According to the above embodiment, of the total 16 bits of a digital signal recorded and reproduced by the DAT, 12 bits are for the image area, 3 bits for the audio area, and one bit for the control area. However, the number of bits and the allocation are not limited to this particular example.

Although video signals of the NTSC system are treated as video signal in the above embodiment, video signals of other systems, such as the PAL system and the SECAM system, can also be handled. In such a case, some change should be made according to the number of frames. For example, in the case of 25 frames per sec, there are 24 pieces of difference compressed image data $\Delta c1-\Delta c24$.

In the above embodiment, the DAT serves as the recording and reproducing apparatus; however, this embodiment can also be applied to the case involving a disk type recording medium or an optical recording medium.

As described above, according to the present invention, video signals for dynamic pictures as well as audio signals can be digitally recorded simultaneously, the former signals through compression, providing a very efficient recording and reproducing apparatus, such as a DAT.

Recorded in the control area are data concerning digital signals allocated in the image area or the audio area, i.e., compression information and signal mode information. When the signal processing operation is changed in reproduction mode based on these data, whatever compression is done at the time of recording, or in whatever mode signals are recorded, good reproduction can be performed.

In the control area in each compression reference period are allocated data concerning digital signals in the image area or the audio area in the succeeding compression reference periods. It is therefore possible to control the signal reproducing system before processing the digital signals in the image area or the audio area in every compression reference period in reproduction mode. With regard to the data concerning the digital signals, the same data is allocated in one compression reference period several times at predetermined intervals. When data reproduction starts from any position, the data concerning the digital signals can efficiently be fetched to control the signal reproducing system smoothly.

When there is a scene change, the signal recording process is reset, the reference image data is prepared, then, the difference image data is prepared based on this reference image data. The amount of the difference image data does not increase very much even when the scene change occurs, and is held in a predetermined image area. In other words, the desirable compression process can always be done.

Since the data for indicating the presence of the scene change is allocated in the compression reference period in the control area immediately before the scene change, it is possible to select only the image immediately after the scene change and reproduce it, based on the data in reproduction mode, for example.

Since recording and reproducing of the digital video signal and digital audio signal are executed at the same timing with the compression reference period as a unit, the timing for the reproduced image always matches with the timing for the reproduced sounds, thereby avoiding a time lag between the image and the associated sounds.

Because predetermined image data to be reproduced is expanded, and expanded image data for one screen is repeatedly output, still pictures based on predetermined reference image data, for example, in each compression reference period or reference image data in the compression reference period immediately after occurrence of a scene change can be manually or automatically displayed one after another on the monitor.

In the control area in each compression reference period are allocated first data and second data concerning digital video signals to be allocated in the image areas in immediately before and immediately after compression reference periods. Further, in both normal reproduction mode and reverse reproduction mode, the operation of the signal reproducing system can be controlled before processing the digital video signal to be reproduced. Therefore, the normal reproduction as well as reverse reproduction can be performed.

In addition, compressed digital video signals for multiple screens are stored at the same addresses in the reverse reproduction mode as done in the normal reproduction mode. In the case where a digital video signal is allocated in the image area in each compression reference period in such a manner that reference image data for one screen is allocated first, then difference compressed image data for multiple screens are allocated, therefore, signal reading from the memory and expanding the read-out signal can be executed in the same manner in normal reproduction mode as in reverse reproduction mode. The reverse reproduction can therefore be realized easily.

As a time code is allocated in the control area in each compression reference period, this time code when fetched at the time of reproduction can be effectively used to control searching, displaying the amount of remaining tape, positional adjustment at the time of edition, and the like.

Further, reproduction at the normal speed and reproduction at a predetermined fast speed can alternately be performed, predetermined image data to be reproduced at the normal speed can be expanded, and expanded image data for one screen can be repeatedly output. As a result, fast-forwarding images can be displayed on the monitor. Furthermore, unlike the fast-forwarding images obtained by the conventional VTR, the fast-forwarding images will not have horizontal noise bars, thus providing images that can be viewed very easily.

Since an area for difference compressed image data can be changed in accordance with the amount of data, the amount of data will not be restricted even when the amount of data increases as a scene changes from an image in slow action to an image in rapid action. It is therefore possible to prevent deterioration of the quality of image data.

Further, data indicating such a change is allocated in the control area. Based on this data, therefore, the addresses of the memory for storing reference image data and difference compressed image data are controlled, the difference compressed image data for each screen can be stored at the associated address. This can ensure accurate signal reproduction as in the case where the area is fixed.

The normal reproduction mode and play pause mode can alternately be repeated, so that image data for each screen expanded after reproduction in normal reproduction mode can be repeatedly output by the number of times associated with the play pause period. Therefore, the time axis of a dynamic picture to be displayed on the monitor is expanded in accordance with the play pause period, thus ensuring slow reproduction at a predetermined speed.

The sync codes detected from the control area of a signal to be reproduced from one recording medium can serve to control the period for data recording on another recording medium. When dubbing is executed by operating the dubbing start key or dubbing stop key, therefore, operational control can be effected in such a way as to record data starting with a point slightly before a certain compression reference period up to a point slightly after another compression reference period. In this manner, the necessary portion can be efficiently dubbed.

As the time code detected from the control area of a signal to be reproduced from one recording medium can serve to control the time for data recording on another recording medium, dubbing in the period set by the dubbing set key can automatically be performed.

In addition, a video signal for a dynamic picture or a still picture as well as an audio signal can simultaneously be recorded or reproduced.

Selectively switching the image area between the dynamic picture area and still picture area can ensure recording/reproducing of a digital video signal for a dynamic picture and a digital video signal for a still picture. For example, for the image portion which requires high quality, the image area can be set to the still picture area to record or reproduce that digital video signal which provides a high-quality still picture.

As data for identifying the dynamic picture area and still picture area is allocated in the control area (e.g., the mode code area), it is possible to effect such control as to automatically shift from reproduction of a dynamic picture to reproduction of a still picture.

It will be obvious to those having ordinary skill in the art that many changes may be made in the above described details of the preferred embodiments of the present invention without departing from the spirit and scope of the present invention.

What is claimed is:

1. A method of recording and reproducing a digital signal comprising the steps of:

forming a composite digital signal consisting of N-parallel-bits (N: integer), having an image area to be a bit portion in which digital video signals are allocated, an audio area to be a bit portion in which digital audio signals are allocated, and a control area to be a bit portion in which control signals are allocated;

allocating compressed digital video signals for multiple screens in said image area of a succession of said composite digital signals over a desired period representative of a compression reference period and allocating a digital audio signal within said audio area of said composite digital signals of said compression reference period;

allocating reference image data for one screen first, then difference compressed image data for multiple screens as said digital video signals to be allocated in said image area of the succession of said composite digital signals in each compression reference period;

recording said composite digital signals in a storage medium and reproducing the recorded composite digital signals from the storage medium;

producing a scene change signal when the difference between two of said multiple screens exceeds a predetermined threshold; and resetting recorded signal processing to start a new compression reference period upon receiving the scene change signal.

2. A method according to claim 1, wherein when said scene change signal is produced, data indicating presence of said scene change signal is allocated in said control area of that compression reference period which lies immediately before said scene change signal.

3. A method of processing a signal, comprising the steps of:

forming a 3-byte digital word of N-parallel-bits consisting of an image byte in which a digitized video data is allocated, an audio byte in which a digitized audio data is allocated and a control byte in which a control data is allocated;

digitizing a video signal and corresponding audio signal for producing digital video samples and corresponding digital audio samples respectively;

compressing said digital video samples and audio samples for producing digitized video data and digitized audio data;

accumulating the digitized video data and digitized audio data for multiple screens of the video signal over a compression reference period;

allocating the digitized video and audio data associated with said compression reference period within the respective video and audio bytes of a serial succession of said 3-byte digital words;

allocating in sequence a reference compressed image data for one screen first, then difference compressed image data of subsequent screens as the digitized video data to be allocated in said video bytes of the succession of said 3-byte digital words in each compression reference period;

producing a scene change code when a difference between two of said multiple screens exceeds a predetermined threshold;

resetting sample compression and data accumulation to start a new compression reference period upon receiving said scene change code;

allocating, upon receiving said scene change code, scene change data indicating the presence of the scene change code in said control byte of that compression reference period which occurs immediately before said screen producing said scene change code;

recording said 3-byte words in a storage medium, whereby said 3-byte words may be subsequently reproduced by a reproduction means.

* * * * *